(12) United States Patent
Torii et al.

(10) Patent No.: US 6,936,312 B2
(45) Date of Patent: Aug. 30, 2005

(54) LIQUID CRYSTAL COMPOSITION AND LIQUID CRYSTAL DISPLAY

(75) Inventors: Yuzuru Torii, Ichihara (JP); Hitoshi Yamamoto, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 10/409,113

(22) Filed: Apr. 9, 2003

(65) Prior Publication Data

US 2003/0222244 A1 Dec. 4, 2003

(30) Foreign Application Priority Data

Apr. 9, 2002 (JP) ...................................... 2002-106625

(51) Int. Cl.$^7$ ....................... C09K 19/12; C09K 19/32; C09K 19/20; C09K 19/30

(52) U.S. Cl. ............. 428/1.1; 252/299.62; 252/299.66; 252/299.67; 252/299.63

(58) Field of Search ...................... 428/1.1; 252/299.63, 252/299.66, 299.67, 299.62

(56) References Cited

U.S. PATENT DOCUMENTS

| | | | |
|---|---|---|---|
| 5,271,867 A | 12/1993 | Koden et al. | 252/299.61 |
| 5,755,994 A | 5/1998 | Kondo et al. | 252/299.61 |
| 5,820,786 A | 10/1998 | Sage et al. | 252/299.66 |
| 5,961,881 A | 10/1999 | Andou et al. | 252/299.63 |
| 6,210,603 B1 | 4/2001 | Kondo et al. | 252/299.66 |
| 6,315,922 B1 | 11/2001 | Takeshita et al. | 252/299.61 |
| 6,325,949 B1 | 12/2001 | Takeshita et al. | 252/299.63 |
| 6,497,929 B1 | 12/2002 | Miyairi et al. | 428/1.1 |
| 6,759,102 B2 * | 7/2004 | Murashiro et al. | 428/1.1 |
| 2002/0093004 A1 | 7/2002 | Tarumi et al. | 252/299.66 |
| 2003/0085382 A1 * | 5/2003 | Murashiro et al. | 252/299.66 |

FOREIGN PATENT DOCUMENTS

| | | | |
|---|---|---|---|
| DE | 10218287 | * | 10/2000 |
| GB | 2 198 743 | | 6/1988 |
| GB | 2240778 | * | 8/1991 |
| JP | 4-257535 | | 9/1992 |
| WO | 90/09420 | | 8/1990 |

* cited by examiner

*Primary Examiner*—Shean C. Wu
(74) *Attorney, Agent, or Firm*—Wenderoth, Lind & Ponack, L.L.P.

(57) ABSTRACT

A liquid crystal composition comprising a first component consisting of at least one compound selected from a group of compounds represented by Formula (I) and a second component consisting of at least one compound selected from a group of compounds represented by Formulas (II-1) to (II-8):

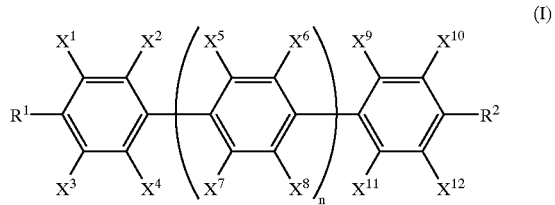

in which each symbols of Formula (I) are defined in the specification and Formulas (II-1) to (II-8) and their symbols are also defined in the specification.

28 Claims, No Drawings

LIQUID CRYSTAL COMPOSITION AND LIQUID CRYSTAL DISPLAY

BACKGROUND OF THE INVENTION

1. Field of the Invention

The present invention relates to a liquid crystal composition having a nematic phase and a positive dielectric anisotropy and a liquid crystal display element comprising this liquid crystal composition. The present invention relates particularly to a liquid crystal display element having a small cell gap and a short response time and a liquid crystal composition having a large optical anisotropy.

The liquid crystal composition of the present invention or the liquid crystal display element of the present invention shall be referred to as the composition or the element respectively. The liquid crystal display element is the general term of a liquid crystal display panel and a liquid crystal display module. The compound represented by Formula (I) is referred to as the compound (I). The compounds represented by the other formulas are shown as well in the same manner.

2. Related Art

In a liquid crystal display element, classification thereof based on an operating mode of liquid crystals includes PC (phase change), TN (twisted nematic), IPS (in-plane switching), STN (super twisted nematic), OCB (optically compensated bend), ECB (electrically controlled birefringence) and VA (vertical alignment). Classification thereof based on a driving mode of an element includes PM (passive matrix) and AM (active matrix) . PM (passive matrix) is classified into static and multiplex, and AM is classified into TFT (thin film transistor) and MIM (metal insulator metal).

These elements contain a liquid crystal composition having suitable characteristics. The following general characteristics are required to this composition in order to improve the general characteristics of the elements.

| No. | General characteristics required for a composition | General characteristics required for an element |
|-----|---------------------------------------------------|--------------------------------------------------|
| 1.  | Stable against heat                               | Long life                                        |
| 2.  | Stable against UV ray[1]                          | Long life                                        |
| 3.  | Wide range of nematic phase                       | Wide usable temperature range                    |
| 4.  | Low viscosity[2]                                  | Short response time                              |
| 5.  | Low threshold voltage                             | Low power consumption                            |
| 6.  | Large resistivity                                 | High voltage holding ratio                       |

[1] A UV ray can be used in a production process.
[2] A composition can be put into a liquid crystal cell in shorter time.

In a composition used for an AM element, the characteristics of Nos. 1 to 6 are important. In a composition used for a PM element, the characteristics of Nos. 1 to 5 are important. In addition to these characteristics, important as well are characteristics such as an optical anisotropy ($\Delta n$) , a dielectric anisotropy ($\Delta \in$) and an elastic constant. Suitable values in the characteristics are varied according to the mode of the element. When a composition is put into a liquid cell having an alignment layer, a liquid crystal molecule stands up by virtue of the action of the alignment layer. A degree of standing up is a pretilt angle. This angle is varied according to the kind of the composition. The large pretilt angle stably aligns the liquid crystal molecule.

In recent years, a technique for producing plates used for an element has been advanced, and a cell gap of the plates tends to be reduced. A cell gap is particularly small in an AM element of a TN mode, an OCB mode and so forth. A cell gap is a distance between two plates and is the same as a thickness of a layer of a liquid crystal composition. In an element of a TN mode, a reduction in the cell gap shortens the response time and is less liable to produce a reverse domain. In an OCB mode, a reduction in a cell gap shortens time (transition time) for transiting from splay alignment to bend alignment and shortens time (response time) required for a liquid crystal molecule to change alignment by a change of an applied voltage.

In these modes, a product ($\Delta n \times d$) of an optical anisotropy ($\Delta n$) and a cell gap (d) is fixed. Accordingly, a composition having a large optical anisotropy is required in order to reduce the cell gap. Compositions having a large optical anisotropy are disclosed in Japanese Patent Application Laid-Open No. 3053/2001, Japanese Patent Application Laid-Open No. 3051/2001, Japanese Patent Application Laid-Open No. 123170/2001 and Japanese Patent Application Laid-Open No. 257535/1992. However, a novel composition having a large optical anisotropy and suitable characteristics is always required in order to improve the characteristics of an element.

SUMMARY OF THE INVENTION

Summary of the invention includes the following A, B and C.

A. A liquid crystal composition comprising a first component consisting of at least one compound selected from a group of compounds represented by Formula (I) and a second component consisting of at least one compound selected from a group of compounds represented by Formulas (II-1) to (II-8):

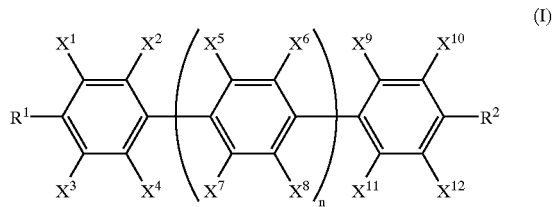

wherein $R^1$ and $R^2$ are independently alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 0, 1 or 2, and

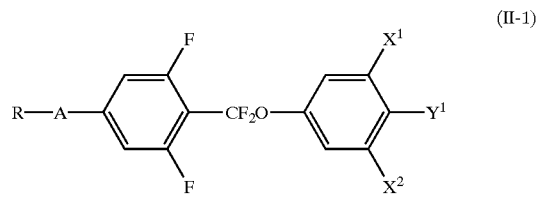

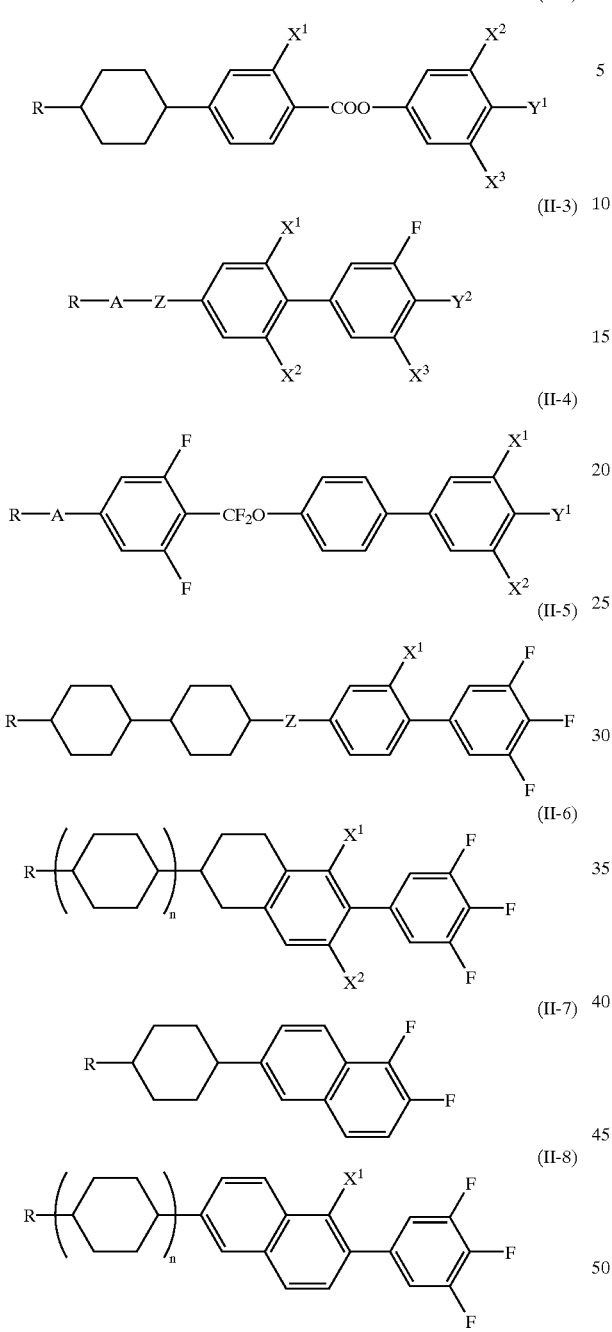

wherein R is alkyl having 1 to 10 carbons; A is 1,4-phenylene or 1,4-cyclohexylene; $X^1$, $X^2$ and $X^3$ are independently hydrogen or fluorine; $Y^1$ is fluorine or —$OCF_3$, and $Y^2$ is fluorine or chlorine; Z is a single bond or —$C_2H_4$—; and n is 0 or 1.

B. A liquid crystal composition comprising a first component consisting of at least one compound selected from a group of compounds represented by Formula (I-1—1) and a second component consisting of at least one compound selected from a group of compounds represented by Formulas (II-1—1), (II-1-3), (II-1-6), (II-3-1), (II-3-2), (II-3—3), (II-3-4), (II-5-1) and (II-5-2):

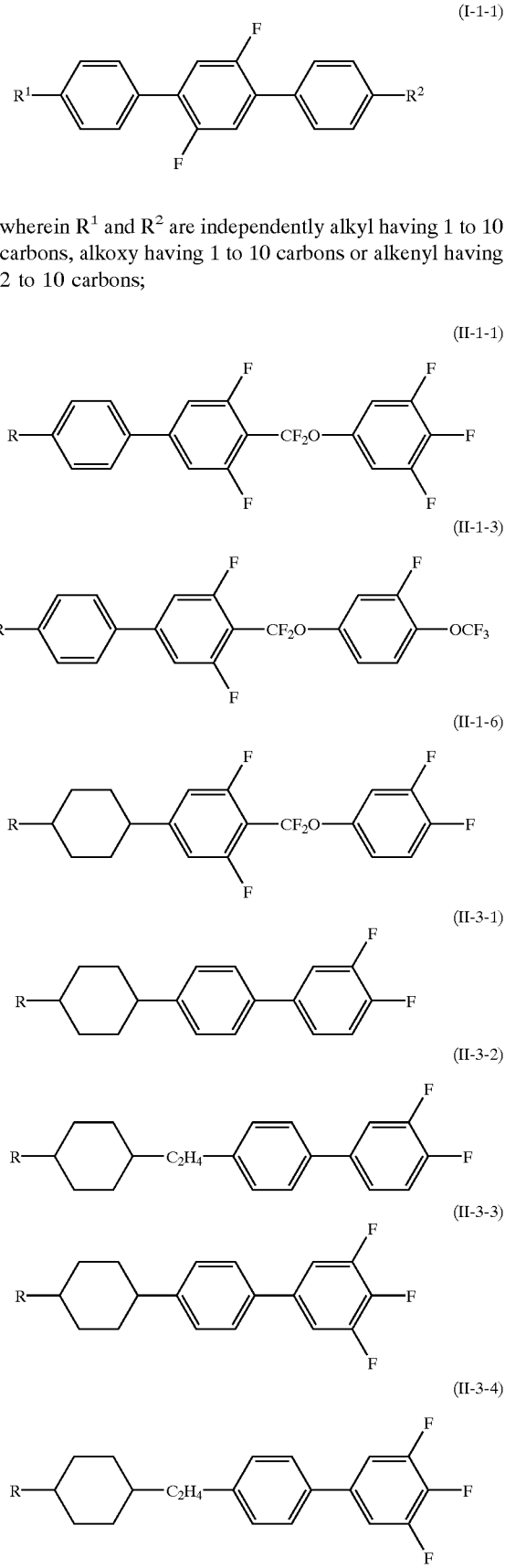

wherein $R^1$ and $R^2$ are independently alkyl having 1 to 10 carbons, alkoxy having 1 to 10 carbons or alkenyl having 2 to 10 carbons;

-continued

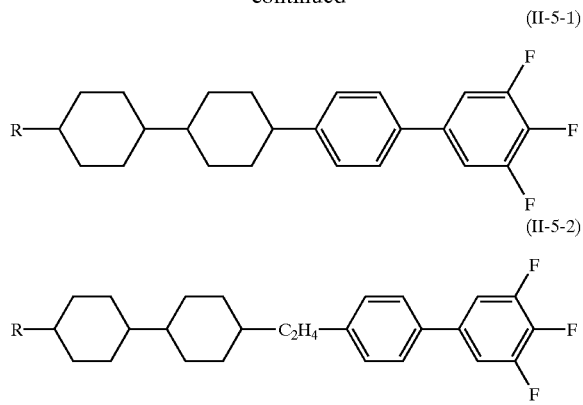

wherein R is alkyl having 1 to 10 carbons.

C. A liquid crystal display element comprising the liquid crystal composition described above.

DETAILED DESCRIPTION OF THE INVENTION

An object of the present invention is to provide a composition having the general characteristics required for the composition, a nematic phase, a particularly large optical anisotropy and a positive dielectric anisotropy and a liquid crystal display element comprising this composition and having the general characteristics required for the element and a short response time. The general characteristics required for the composition and the element are described above.

Investigations repeated by the present inventors in order to achieve the object described above have resulted in finding the following. The composition of the present invention has the general characteristics required for the composition, a nematic phase, a particularly large optical anisotropy and a positive dielectric anisotropy. A liquid crystal display element comprising this composition has general characteristics required for the element and a short response time. It has also been found that this composition is suited to an element having a small cell gap and that it is suited particularly to an AM element having a small cell gap. The embodiment for achieving the object of the present invention is described in an item 1 to an item 5. The preferred embodiments of the substituents of the compounds which are the components of the composition shall be described as well.

1. A liquid crystal composition comprising a first component consisting of at least one compound selected from a group of compounds represented by Formula (I) and a second component consisting of at least one compound selected from a group of compounds represented by Formulas (II-1) to (II-8):

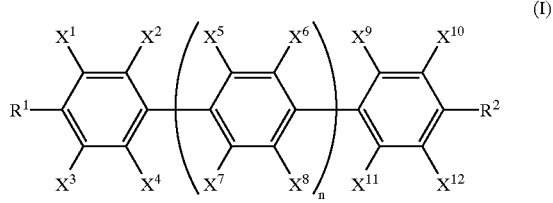

(I)

wherein $R^1$ and $R^2$ are independently alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorines; when one 1,4-phenylene has two fluorines, the positions of fluorines are 2- and 5-positions or 2- and 6-positions; and n is 0, 1 or 2.

Preferred $R^1$ or $R^2$ is methyl, ethyl, propyl, butyl, pentyl, hexyl, heptyl, octyl, methoxy, ethoxy, propoxy, butoxy, pentyloxy, hexyloxy, heptyloxy, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl. Among alkyl, alkoxy and alkenyl, preferred $R^1$ or $R^2$ is alkyl. More preferred alkyl is ethyl, propyl and pentyl.

When one 1,4-phenylene has two fluorines, the combinations of the positions of fluorines are three cases of 2- and 3-positions, 2- and 5-positions, and 2- and 6-positions. Among them, preferred is 1,4-phenylene in which 2- and 5-positions are occupied with fluorines. Preferred as well is 1,4-phenylene in which 2- and 6-positions are occupied with fluorines. The compound having 1,4-phenylene in which 2- and 3-positions are occupied with fluorines is not preferred as the first component. In $X^1$ to $X^{12}$, the preferred total number of fluorine is 2 to 5. More preferred total number is 2 and 3.

n is 0, 1 or 2. When n is 0, the compound (I) has two rings. When n is 1, the compound (I) has three rings. When n is 2, the compound (I) has four rings as shown below. This compound has two $X^5$. They are independently hydrogen or fluorine. That is, they may be the same or different. $X^6$, $X^7$ and $X^8$ shall be explained in the same manner.

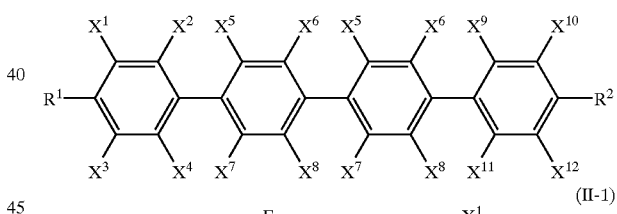

(II-1)

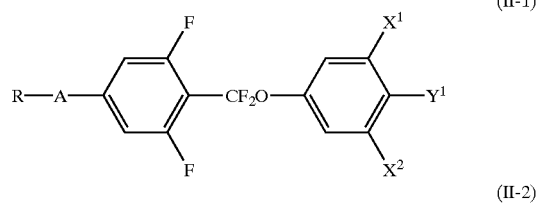

(II-2)

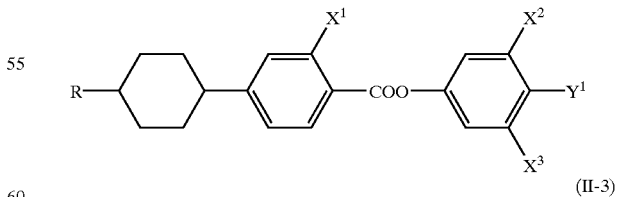

(II-3)

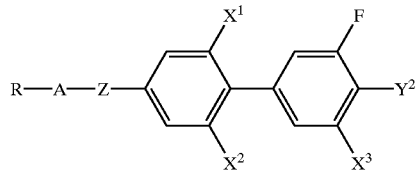

-continued

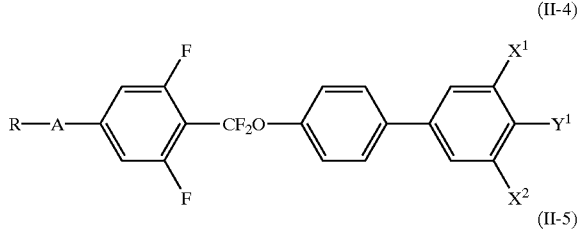
(II-4)

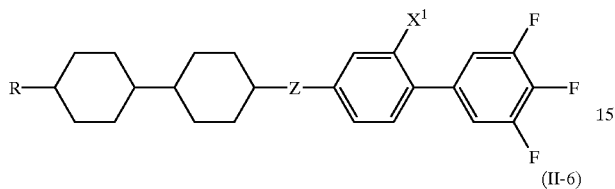
(II-5)

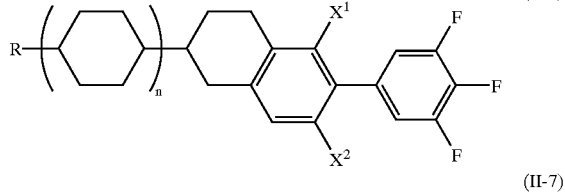
(II-6)

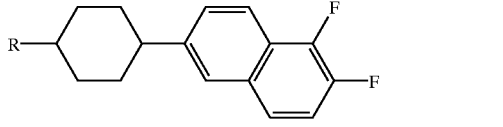
(II-7)

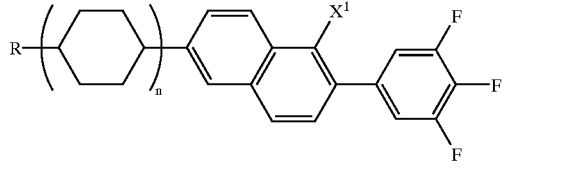
(II-8)

In Formula (II-1) to (II-8), R is alkyl having 1 to 10 carbons; A is 1,4-phenylene or 1,4-cyclohexylene; $X^1$, $X^2$ and $X^3$ are independently hydrogen or fluorine; $Y^1$ is fluorine or —$OCF_3$, and $Y^2$ is fluorine or chlorine; Z is a single bond or —$C_2H_4$—; and n is 0 or 1.

Preferred R is methyl, ethyl, propyl, butyl, pentyl, hexyl, heptyl or octyl. More preferred R is ethyl, propyl or pentyl. In Formula (II-1) to (II-8), the symbol of R has been used for plural compounds. These R may be the same or different. The same shall apply to the symbols of A, $X^1$, $X^2$, $X^3$, $Y^1$, $Y^2$ and n.

2. The liquid crystal composition as described in the item 1, wherein the first component accounts for 5% to 50% by weight, and the second component accounts for 30% to 95% by weight each based on the whole weight of the liquid crystal composition.

3. The liquid crystal composition as described in the item 1 or 2, further comprising a third component consisting of at least one compound selected from a group of compounds represented by Formulas (III-1) and (III-2):

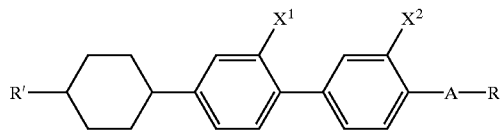
(III-1)

wherein R' is alkyl having 1 to 10 carbons or alkoxymethyl having 2 to 10 carbons; R is alkyl having 1 to 10 carbons; A is 1,4-phenylene or 1,4-cyclohexylene; and $X^1$ and $X^2$ are independently hydrogen or fluorine.

Preferred R' is methyl, ethyl, propyl, butyl, pentyl, hexyl, heptyl, octyl, methoxymethyl, ethoxymethyl, propoxymethyl, butoxymethyl and pentyloxymethyl. Among alkyl and alkoxymethyl, preferred R' is alkyl. More preferred alkyl is ethyl, propyl and pentyl.

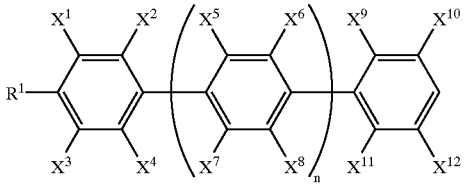
(III-2)

wherein $R^1$ is alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 0, 1 or 2.

Preferred $R^1$ is the same as that described in the item 1. When one 1,4-phenylene has two fluorines, the combinations of the positions of fluorines are three cases of 2- and 3-positions, 2- and 5-positions and 2- and 6-positions. Among them, preferred is 1,4-phenylene in which 2- and 5-positions are occupied with fluorines. Preferred as well is 1,4-phenylene in which 2- and 6-positions are occupied with fluorine. The compound having 1,4-phenylene in which 2- and 3-positions are occupied with fluorine is not preferred as the third component. In $X^1$ to $X^{12}$, the preferred total number of fluorine is 2 to 5. More preferred total number is 2 and 3.

n is 0, 1 or 2. When n is 0, the compound (III-2) has two rings. When n is 1, the compound (III-2) has three rings. When n is 2, the compound (III-2) has four rings. This compound has two $X^5$. They are independently hydrogen or fluorine. That is, they may be the same or different. $X^6$, $X^7$ and $X^8$ shall be explained in the same manner.

4. The liquid crystal composition as described in the item 3, wherein the third component accounts for 1% to 40% by weight based on the whole weight of the liquid crystal composition.

5. A liquid crystal composition comprising a first component consisting of at least one compound selected from a group of compounds represented by Formula (I-1—1) and a second component consisting of at least one compound selected from a group of compounds represented by Formulas (II-1—1), (II-1-3), (II-1-6), (II-3-1), (II-3-2), (II-3—3), (II-3-4), (II-5-1) and (II-5-2):

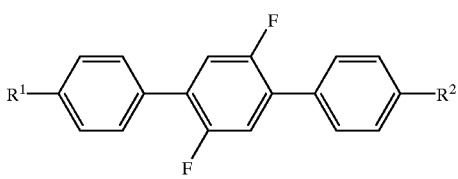
(I-1-1)

wherein $R^1$ and $R^2$ are independently alkyl having 1 to 10 carbons, alkoxy having 1 to 10 carbons or alkenyl having 2 to 10 carbons;

(II-1-1)
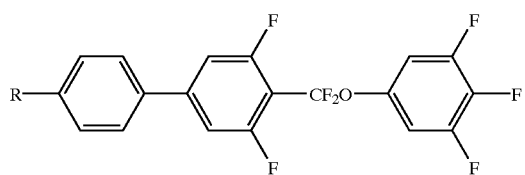

(II-1-3)
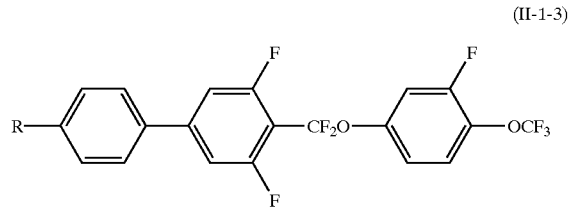

(II-1-6)
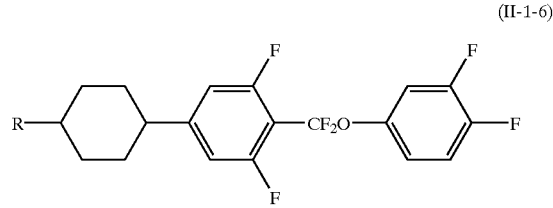

(II-3-1)
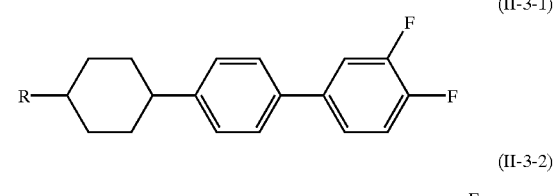

(II-3-2)
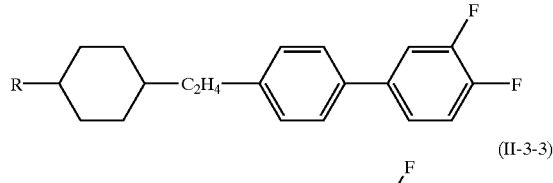

(II-3-3)
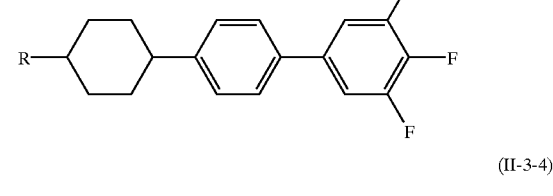

(II-3-4)
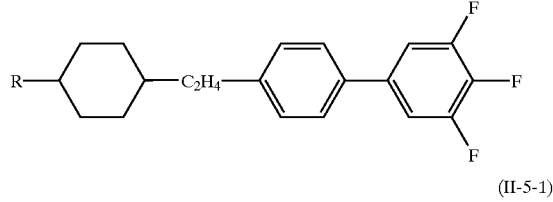

(II-5-1)
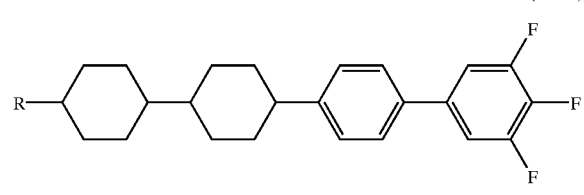

(II-5-2)
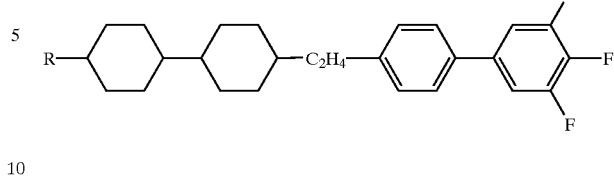

wherein R is alkyl having 1 to 10 carbons.

6. The liquid crystal composition as described in the item 5, wherein the first component accounts for 5% to 50% by weight, and the second component accounts for 30% to 95% by weight each based on the whole weight of the liquid crystal composition.

7. The liquid crystal composition as described in the item 5 or 6, further comprising a third component consisting of at least one compound selected from a group of compounds represented by Formulas (III-1—1) and (III-2-1)

(III-1-1)
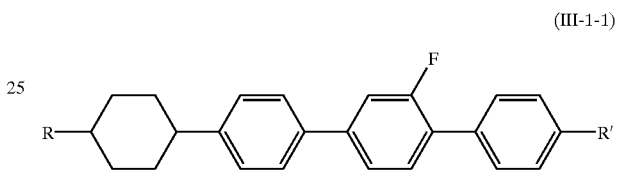

(III-2-1)
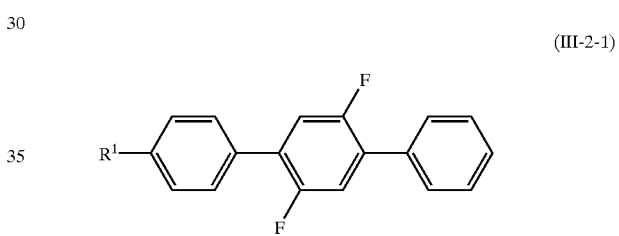

wherein R is alkyl having 1 to 10 carbons; $R^1$ is alkyl having 1 to 10 carbons, alkoxy having 1 to 10 carbons or alkenyl having 2 to 10 carbons; and R' is alkyl having 1 to 10 carbons or alkoxymethyl having 2 to 10 carbons.

8. The liquid crystal composition as described in the item 7, wherein the third component accounts for 1% to 30% by weight based on the whole weight of the liquid crystal composition.

9. A liquid crystal display element comprising the liquid crystal composition as described in any of the items 1 to 8.

The present invention relates to the composition having the general characteristics required for the composition and a particularly large optical anisotropy and the element having general characteristics required for the element and a short response time. The principal characteristics of the compounds which are the components in the composition of the present invention, the major effects brought about to the composition when adding the compounds to the composition and a preferred proportion of the compounds shall be explained. An upper limit temperature of a nematic phase and a lower limit temperature of the nematic phase are abbreviated as an upper limit temperature and a lower limit temperature respectively.

The first component is the compound (I). The compound (I) has the characteristics that it is stable against heat and a UV ray; an upper limit temperature is relatively high; a viscosity is low; an optical anisotropy is very large; a dielectric anisotropy is almost zero; and a resistivity is large.

This compound has the effects of controlling an upper limit temperature, reducing a viscosity, making an optical anisotropy particularly large and raising a voltage holding ratio in the composition. The composition to which this compound is added produces a large pretilt angle by an alignment layer.

The second component is the compounds (II-1) to (II-8). These compounds have the characteristics that stability against heat and a UV ray is excellent and that an optical anisotropy is relatively large and a resistivity is large. These compounds have the effects of controlling an optical anisotropy and raising a voltage holding ratio in the composition.

The compound (II-1) has the characteristics that a viscosity is low and a dielectric anisotropy is very large. This compound has further the effects of reducing a viscosity and reducing particularly a threshold voltage in the composition. The compound (II-2) has the characteristics that an upper limit temperature is high and a dielectric anisotropy is large. This compound has further the effects of elevating an upper limit temperature and reducing a threshold voltage in the composition. The compound (II-3) has the characteristics that an upper limit temperature is high and a dielectric anisotropy is relatively large. This compound has further the effects of elevating an upper limit temperature and controlling a dielectric anisotropy in the composition.

The compound (II-4) has the characteristics that an upper limit temperature is very high and an optical anisotropy is large and that a dielectric anisotropy is very large. This compound has further the effects of particularly elevating an upper limit temperature, making an optical anisotropy large and particularly reducing a threshold voltage in the composition. The compound (II-5) has the characteristics that an upper limit temperature is high and a dielectric anisotropy is relatively large. This compound has further the effects of elevating an upper limit temperature and controlling a threshold voltage in the composition. The compounds (II-6) to (II-8) have the characteristic that a dielectric anisotropy is relatively high. These compounds have further the effect of controlling a threshold voltage in the composition.

The third component is the compound (III-1) or (III-2). These compounds have the characteristics that they are stable against heat and a UV ray and have a very large optical anisotropy and that they have a dielectric anisotropy of almost zero and a large resistivity. These compounds have the effects of making an optical anisotropy particularly large and raising a voltage holding ratio in the composition. The composition to which this compound is added produces a large pretilt angle by an alignment layer. The compound (III-1) has the characteristic that an upper limit temperature is very high. This compound has further the effect of particularly elevating an upper limit temperature in the composition. The compound (III-2) has the characteristic that an upper limit temperature is relatively high. This compound has further the effect of controlling an upper limit temperature in the composition.

The compounds which are the components of the composition have the following preferred proportions. The proportion is a weight percentage (% by weight) based on the whole weight of the composition. The compound (I) which is the first component has a preferred proportion of 5% or more for making the optical anisotropy large and 50% or less for reducing the threshold voltage. Further preferred proportion is 10% to 40%. The compounds (II-1) to (II-8) which are the second component have a preferred proportion of 30% or more for reducing the threshold voltage and 95% or less for lowering a lower limit temperature of the nematic phase. Further preferred proportion is 40% to 95%. The compounds (III-1) and (III-2) which are the third component have a preferred proportion of 40% or less for lowering a lower limit temperature of the nematic phase. Further preferred proportion is 1% to 40%, and particularly preferred proportion is 1% to 30%.

The preferred embodiment of the compounds which are the components of the composition shall further be explained. The preferred compound (I) is the following compound (I-1—1) to compound (I-1-27). The preferred compound (II) is the compound (II-1—1) to the compound (II-8-4). The preferred compound (III-1) is the compound (III-1—1) to the compound (III-1-4). The preferred compound (III-2) is the compound (III-2-1) to the compound (II-2-27). In these preferred compounds, $R^1$ and $R^2$ are independently alkyl having 1 to 10 carbons, alkoxy having 1 to 10 carbons or alkenyl having 2 to 10 carbons; R' is alkyl having 1 to 10 carbons or alkoxymethyl having 2 to 10 carbons; and R is alkyl having 1 to 10 carbons. In these compounds, the configuration of 1,4-cyclohexylene is preferably trans rather than cis.

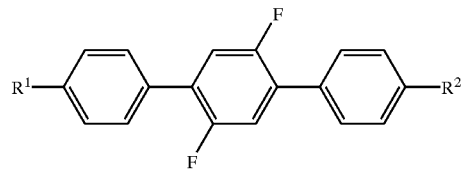

(I-1-1)

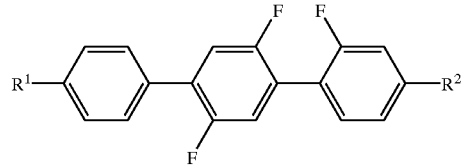

(I-1-2)

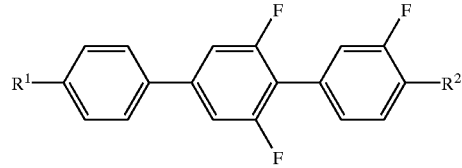

(I-1-3)

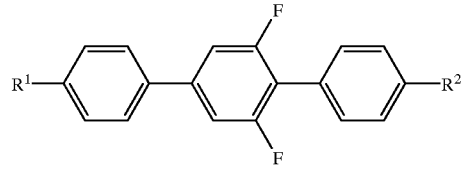

(I-1-4)

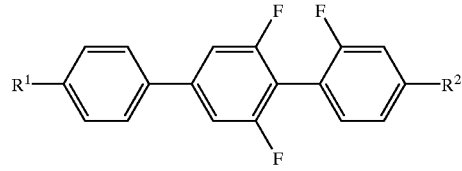

(I-1-5)

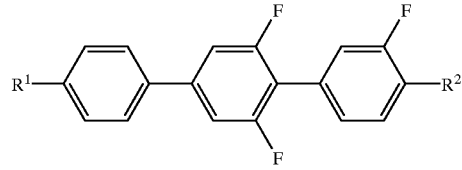

(I-1-6)

(I-1-7) 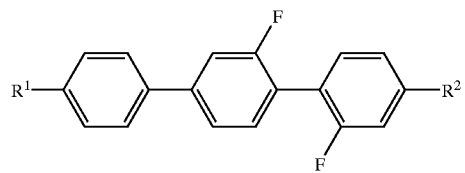
(I-1-8) 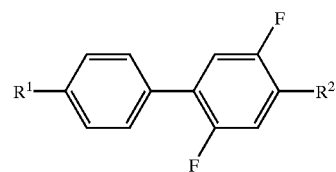
(I-1-9) 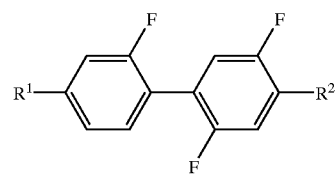
(I-1-10) 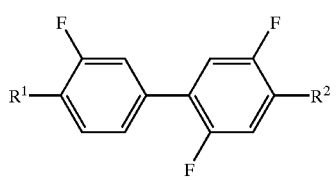
(I-1-11) 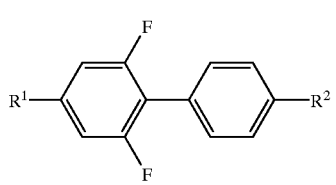
(I-1-12) 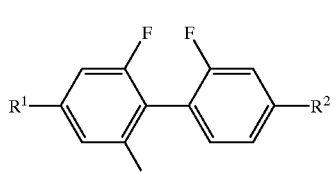
(I-1-13) 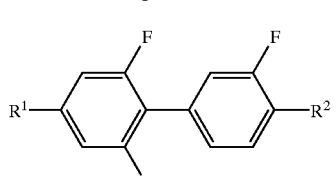
(I-1-14) 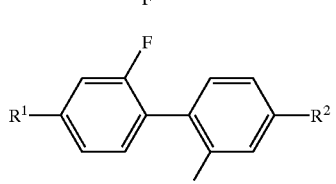
(I-1-15) 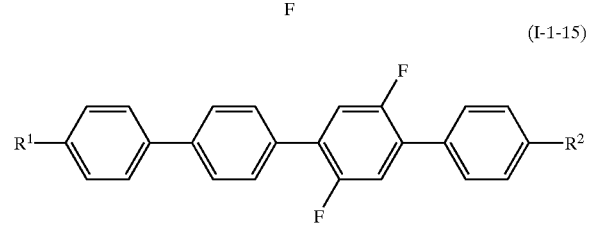
(I-1-16) 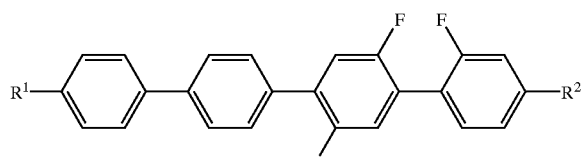
(I-1-17)
(I-1-18)
(I-1-19)
(I-1-20)
(I-1-21)
(I-1-22)
(I-1-23)

(Chemical structure diagrams of liquid crystal compounds labeled I-1-24, I-1-25, I-1-26, I-1-27, II-1-1, II-1-2, II-1-3, II-1-4, II-1-5, II-1-6, II-1-7, II-1-8, II-2-1, II-2-2, II-3-1, II-3-2, II-3-3.)

(II-3-4) 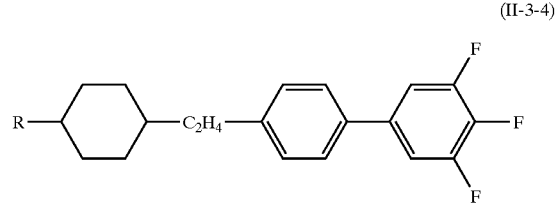
(II-3-5) 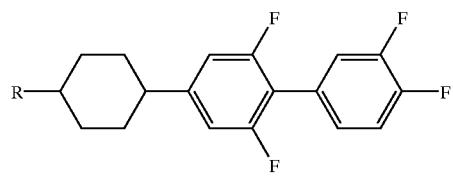
(II-3-6) 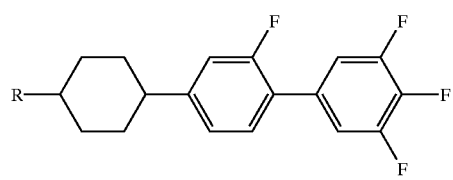
(II-3-7) 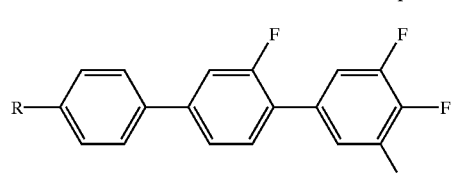
(II-3-8) 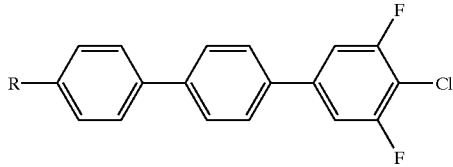
(II-4-1) 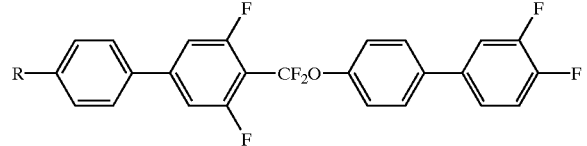
(II-4-2) 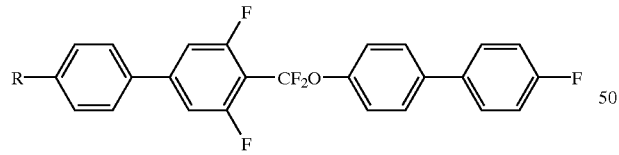
(II-4-3) 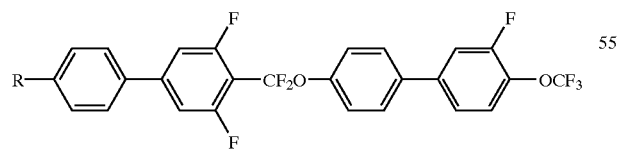
(II-4-4) 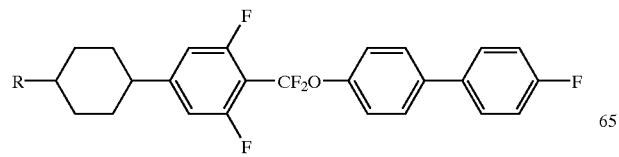
(II-5-1) 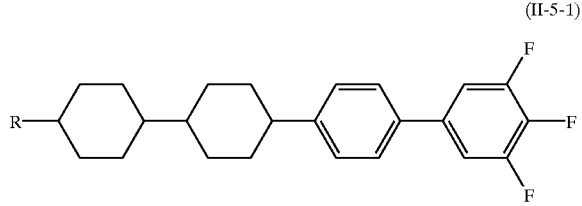
(II-5-2) 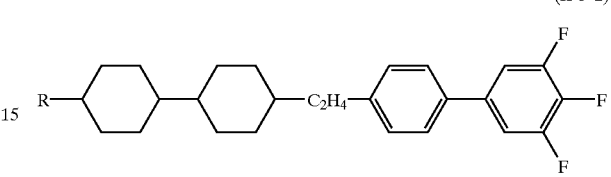
(II-5-3) 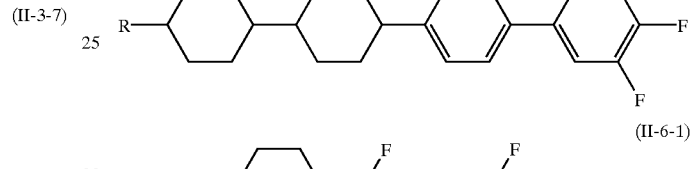
(II-6-1) 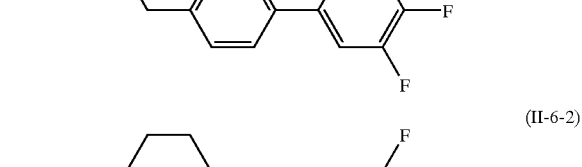
(II-6-2) 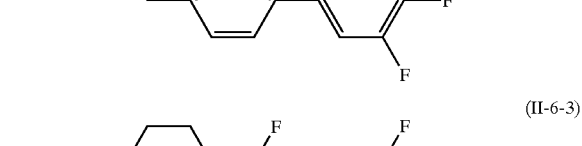
(II-6-3) 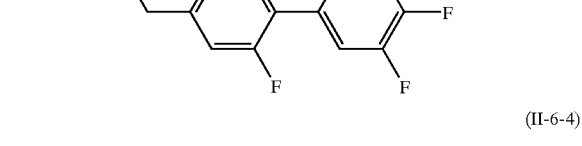
(II-6-4) 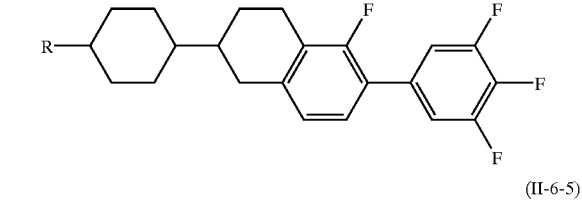
(II-6-5) 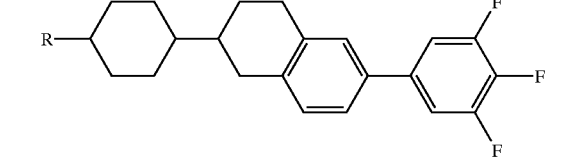

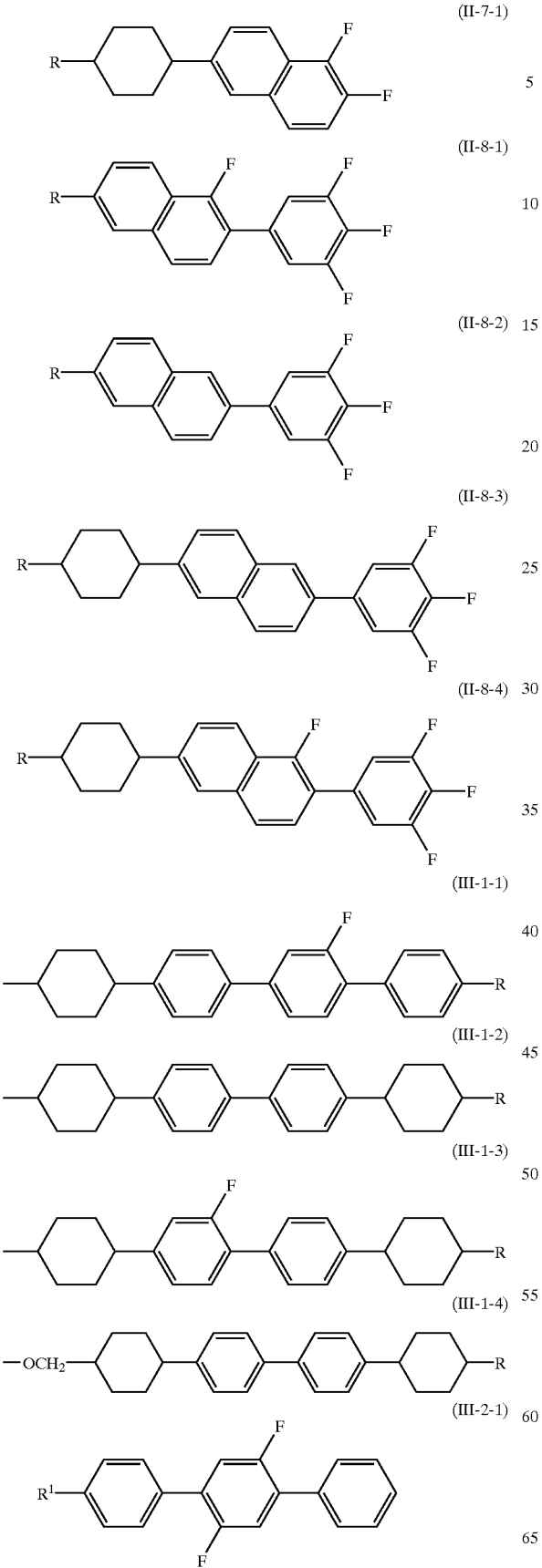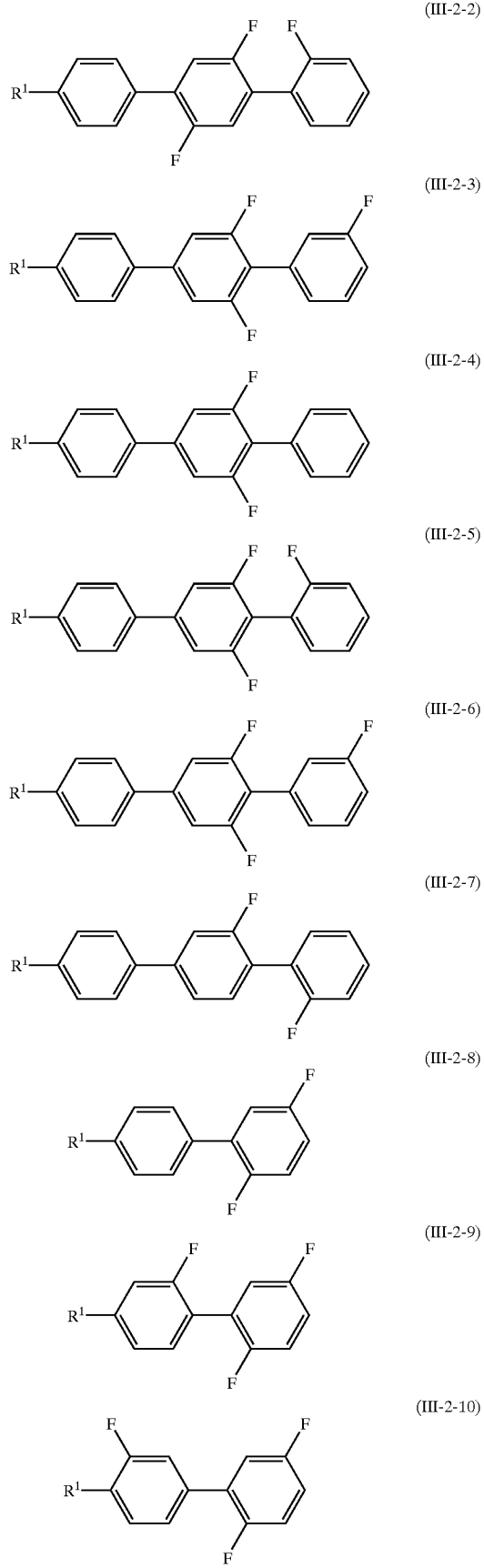

-continued
(III-2-11)
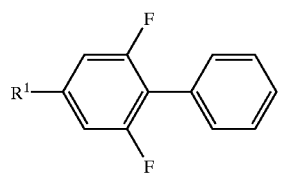
(III-2-12)
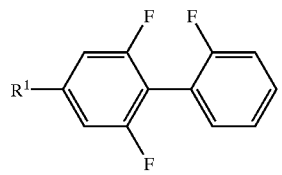
(III-2-13)
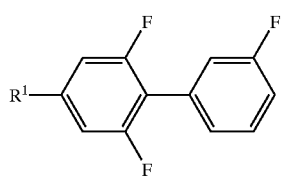
(III-2-14)
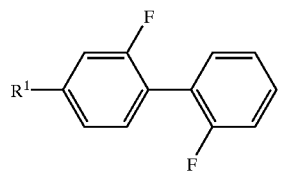
(III-2-15)
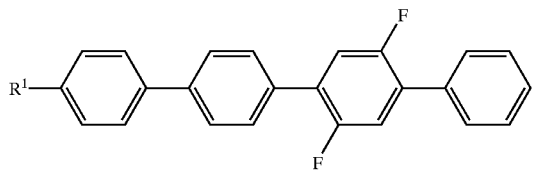
(III-2-16)
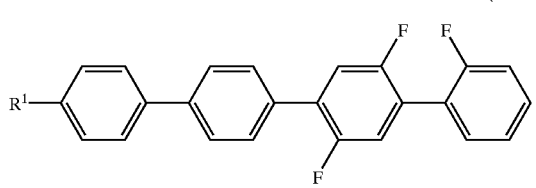
(III-2-17)
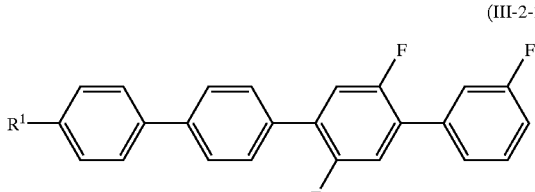
(III-2-18)
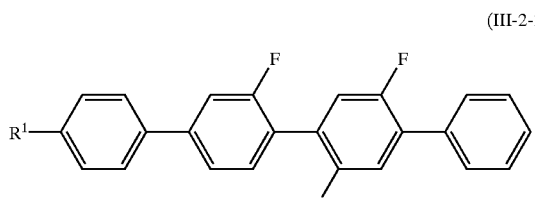
-continued
(III-2-19)
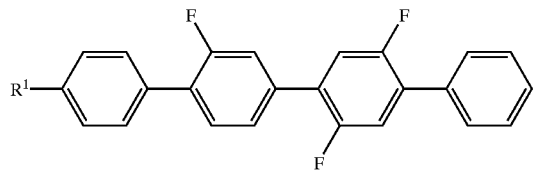
(III-2-20)
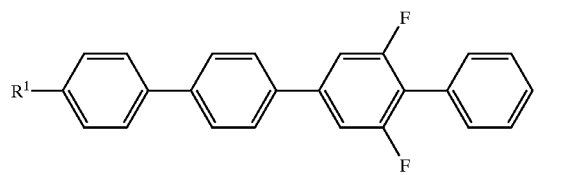
(III-2-21)
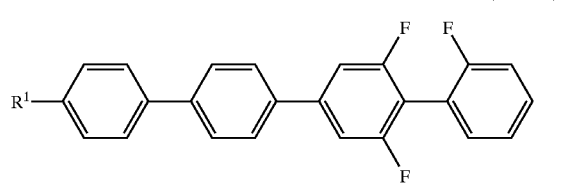
(III-2-22)
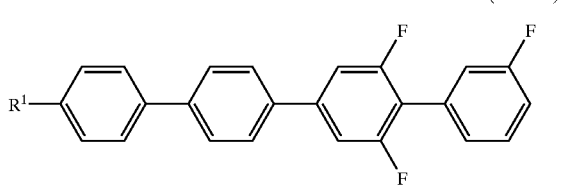
(III-2-23)
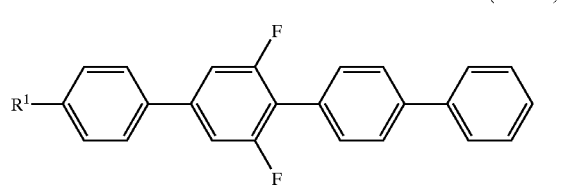
(III-2-24)
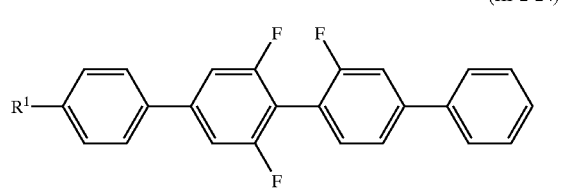
(III-2-25)
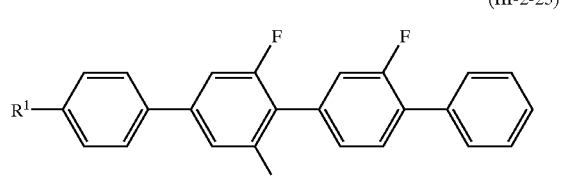
(III-2-26)
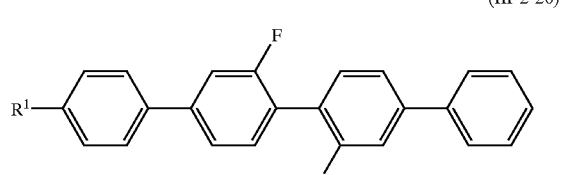

(III-2-27)

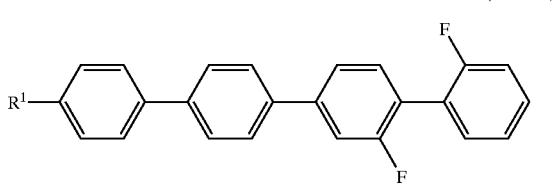

The compounds which are the components of the composition can be synthesized by publicly known methods. In respect to the compound (I), for example, the compound (I-1) can be synthesized by a method described in Japanese Patent Application Laid-Open No. 257535/1992. In respect to the compounds (II-1) and (II-4), for example, the compounds (II-1-5) and (II-4-1) can be synthesized by a method described in Japanese Patent Application Laid-Open No. 251186/1998. In respect to the compounds (II-2), (II-3) and (II-5), for example, the compounds (II-2-1), (II-3—3) and (II-5-1) can be synthesized by a method described in Japanese Patent Application Laid-Open No. 233626/1990.

In respect to the compounds (II-6) to (II-8), for example, the compound (II-6-1) can be synthesized by a method described in a lecture abstract of Japan Liquid Crystal Society Forum, 1C11 in 2000. The compounds (II-7) and (II-8-1) can be synthesized by a method described in a lecture abstract of Japan Liquid Crystal Society Forum, 1C10 in 2000. In respect to the compound (III-1), for example, the compound (II-1—1) can be synthesized by a method described in Japanese Patent Application Laid-Open No. 237949/1990. The other compounds can readily be synthesized by methods described in New Experimental Chemical Course (Maruzen Co., Ltd.), Organic Syntheses, John Wiley & Sons, Inc. and Organic Reactions, John Wiley & Sons, Inc.

The composition of the present invention comprises the first component and the second component. This composition may further comprise the third component. This composition may further comprise the other compounds which are different from the first component, the second component and the third component. For example, the other liquid crystal compounds can be added for the purpose of controlling the characteristics. Additives may be added to improve the characteristics. For example, a chiral dopant is added for the purpose of inducing a helical structure of liquid crystals to provide a twist angle. A dichroic dyer may be added in order to use it for an element of a GH (guest host) mode. The composition is prepared by a publicly know method. For example, the compounds which are the components are mixed and dissolved with each other by heating.

The composition of the present invention can be used for an element having a mode such as PC, TN, IPS, STN, OCB, ECB and VA. This composition is suited to an element having a small cell gap. This composition is suited particularly to an AM element having a small cell gap. This composition can be used as well for an NCAP (nematic curvilinear aligned phase) element prepared by microencapsulation and a PD (polymer dispersed) element in which a three-dimensional reticulated high polymer is formed in the composition. An example of the PD element is a PN (polymer network) element. These elements have the general characteristics required for an element and a short response time.

EXAMPLES

The present invention shall be explained in details with reference to examples. The present invention shall not be restricted by these examples. A proportion of the components shown in the comparative examples and the examples is % by weight. The compounds in the comparative examples and the examples are shown by symbols based on definitions shown in the following Table 1. (1), (2), (3) or (-) shown at the right side of the symbols of the compounds shows the first component, the second component, the third component or the other compound, respectively. Lastly, the characteristic values of the composition are shown.

The following is concluded by comparing the results obtained in Comparative Examples 1 to 4 with the results obtained in Examples 1 to 17. The compositions of the examples had the general characteristics required for the composition, a nematic phase, a particularly large optical anisotropy and a positive dielectric anisotropy. The liquid crystal display element comprising this composition had general characteristics required for the element and a short response time. This composition was suited to an element having a small cell gap and suited particularly to an AM element having a small cell gap.

TABLE 1

Method for Description of Compounds Using Symbols
R—($A_1$)—$Z_1$-...-$Z_n$—($A_n$)—X

| | Symbol |
|---|---|
| 1) Left terminal group R— | |
| $C_nH_{2n+1}$— | n- |
| $C_nH_{2n+1}OCH_2$— | nO1- |
| 2) Ring structure —($A_n$)— | |
| [benzene ring] | B |
| [benzene ring with F] | B (F) |
| [benzene ring with 2F] | B (F, F) |
| [benzene ring with 2F, 5F] | B (2F, 5F) |
| [benzene ring with 2F] | B (2F) |
| [cyclohexane ring] | H |

TABLE 1-continued

Method for Description of Compounds Using Symbols
R—(A₁)—Z₁-. . .-Zₙ—(Aₙ)—X

| Structure | Symbol |
|---|---|
| (naphthalene) | Np |
| (fluoronaphthalene) | Np (F) |
| (tetrahydronaphthalene) | Npr |
| (fluoro tetrahydronaphthalene) | Npr (F) |

3) Bonding group —Zₙ—

| | |
|---|---|
| —C₂H₄— | 2 |
| —CF₃O— | CF2O |
| —COO— | E |

4) Right terminal group —X

| | |
|---|---|
| —F | —F |
| —Cl | —CL |
| —OCF₃ | —OCF3 |
| —CₙH₂ₙ₊₁ | -n |

5) Examples of Description

Example 1.  3-H2B(F)B(F,F)-F (structure: C₃H₇-cyclohexyl-C₂H₄-phenyl(F)-phenyl(F,F)-F)

Example 2.  3-BB(2F, 5F)B-3

(structure: C₃H₇-phenyl-phenyl(2F,5F)-phenyl-C₃H₇)

Example 3.  5-HNp(F)B(F,F)-F (structure: C₅H₁₁-cyclohexyl-Np(F)-phenyl(F,F)-F)

TABLE 1-continued

Method for Description of Compounds Using Symbols
R—(A₁)—Z₁-. . .-Zₙ—(Aₙ)—X

Example 4.  5-BB(2F, 5F)B(F)

(structure: C₅H₁₁-phenyl-phenyl(2F,5F)-phenyl(F))

The characteristic values were measured according to the following methods.

Phase transition temperature of a nematic-isotropic liquid ($T_{NI}$; degrees C.): the sample was put on a hot plate of a melting point measuring apparatus equipped with a polarization microscope and heated at a ratio of 1 degree C./minute. Measured was a temperature at which a part of the sample was changed from a nematic phase to an isotropic liquid.

Lower limit temperature of a nematic phase ($T_C$; degrees C.): the sample having a nematic phase was stored in a freezer of 0 degrees C., −10 degrees C., −20 degrees C., −30 degrees C. or −40 degrees C. for 10 days, and then the liquid crystal phase was observed. For example, when the sample stayed in the nematic phase at −20 degrees C. and was changed to crystals or a smectic phase at −30 degrees C., a lower limit temperature of the nematic phase was described as <−20 degrees C.

Optical anisotropy (refractive index anisotropy; Δn; measured at 25 degrees C.): the optical anisotropy was measured with light having a wavelength of 589 nm by means of an Abbe refractometer.

Viscosity (η; measured at 20 degrees C.; mPa·s): the viscosity was measured by means of an E type viscometer.

Threshold voltage (Vth; measured at 25 degrees C.; V): the sample was put into a liquid crystal display element of a normally white mode having a cell gap of (0.5/Δn) μm between two glass plates and a twist angle of 80 degrees. A rectangular wave having a frequency of 32 Hz was applied to this element. The applied voltage was increased to measure a value of voltage when a transmittance of light passing through the element reached 90%.

Voltage holding ratio (VHR; %): measured according to a method for measuring a voltage holding ratio of an element having a liquid crystal composition and an alignment layer which is described in Electronic Industries Association of Japan Standard EIAJ ED-2521A. The wave form of the applied voltage was observed by means of a cathode ray oscilloscope to determine an area between a voltage curve and a horizontal line in a unit frequency. This value was compared with the initial value to calculate the voltage holding ratio. The element used for the measurement had a polyimide alignment layer, and the cell gap was 6 μm. The value measured at 25 degrees C. was described as VHR (25 degrees C.), and the value measured at 100 degrees C. was described as VHR (100 degrees C.).

Stability against UV ray: a voltage holding ratio (VHR; measured at 25 degrees C.) and an upper limit temperature ($T_{NI}$) of a nematic phase before irradiated with a UV ray were compared with a voltage holding ratio [VHR (UV); measured at 25 degrees C.] and an upper limit temperature [$T_{NI}$ (UV)] of the nematic phase after irradiated to judge the stability. A liquid crystal cell used for the measurement had a polyimide alignment layer, and the cell gap was 6 μm. Liquid crystals were poured into this cell and irradiated with light for 20 minutes. The light source was a ultra high voltage mercury lamp USH-500D (manufactured by Ushio Electric Co., Ltd.), and a distance between the cell and the light source was 20 cm.

Response time (τ; measured at 25 degrees C.; millisecond): the sample was poured into a liquid crystal cell having a cell gap of (0.5/Δn) μm and a twist angle of 80 degrees. A rectangular wave (5V) having a frequency of 60 Hz was applied to this cell to measure a response time (τ on) when the liquid crystal stood up and a response time (τ off) when the liquid crystal lay down. The response time is the sum of τ on and τ off.

Comparative Example 1

Among compositions disclosed in Japanese Patent Application Laid-Open No. 3053/2001, the composition of Example 3 having the largest optical anisotropy was selected. The components and the characteristics of this composition are described below. In this composition, an optical anisotropy is small, and a response time is long.

| | |
|---|---|
| 2-BB(F,F)CF2OB(F,F)-F | 12.0% |
| 3-BB(F,F)CF2OB(F,F)-F | 13.0% |
| 3-HBB(F,F)CF2OB(F)-F | 5.0% |
| 2-HBB(F,F)CF2OB(F,F)-F | 10.0% |
| 3-HBB(F,F)CF2OB(F,F)-F | 10.0% |
| 2-BB(F,F)CF2OBB(F)-F | 5.0% |
| 3-BB(F,F)CF2OBB(F)-F | 5.0% |
| 3-BB(F,F)CF2OB(F,F)B(F)-F | 3.0% |
| 2-BBB(F,F)CF2OB(F,F)-F | 3.0% |
| 3-BBB(F,F)CF2OB(F,F)-F | 4.0% |
| 3-HHB(F,F)-F | 8.0% |
| 4-HHB(F,F)-F | 5.0% |
| 3-H2HB(F,F)-F | 10.0% |
| 3-H2BB(F,F)-F | 7.0% |

$T_{NI}$ = 78.7° C.; $T_C$ < -20° C.; Δn = 0.139; η = 65.3 mPa · s; Vth = 1.00 V; VHR (25° C.) = 98.7%; VHR (100° C.) = 95.2%; VHR (UV) = 97.3%; $T_{NI}$ (UV) = 78.0° C.; τ = 60.8 ms.

Comparative Example 2

Among compositions disclosed in Japanese Patent Application Laid-Open No. 3051/2001, the composition of Example 5 having the largest optical anisotropy was selected. The components and the characteristics of this composition are described below. In this composition, an optical anisotropy is small, and a response time is long.

| | |
|---|---|
| 3-B(F,F)CF2OBB(F)-F | 7.0% |
| 5-B(F,F)CF2OBB(F)-OCF3 | 5.0% |
| 5-B(F,F)CF2OBB(F)-F | 5.0% |
| 3-B(F,F)CF2OB(F,F)B(F)-F | 3.0% |
| 3-HB(F)B(F,F)CF2OB(F,F)-F | 5.0% |
| 2-HBB(F,F)CF2OB(F)-OCF3 | 5.0% |
| 3-BB(F,F)CF2OBB(F)-F | 5.0% |
| 3-BB(F,F)CF2OB(F,F)B(F)-F | 3.0% |
| 2-HBB(F)-F | 3.0% |
| 3-HBB(F)-F | 3.0% |
| 5-HBB(F)-F | 6.0% |
| 3-HBB(F,F)-F | 15.0% |
| 5-HBB(F,F)-F | 15.0% |
| 3-H2BB(F,F)-F | 6.0% |
| 5-HBB(F)B-2 | 7.0% |
| 5-HBB(F)B-3 | 7.0% |

$T_{NI}$ = 99.4° C.; $T_C$ < -20° C.; η = 50.1 mPa · s; Δn = 0.162; Vth = 1.34 V; VHR (25° C.) = 98.7%; VHR (100° C.) = 95.0%; VHR (UV) = 97.2%; $T_{NI}$ (UV) = 99.0° C.; τ = 29.0 ms.

Comparative Example 3

Among compositions disclosed in Japanese Patent Application Laid-Open No. 123170/2001, the composition of Example 6 having the largest optical anisotropy was selected. The components and the characteristics of this composition are described below. In this composition, an optical anisotropy is small, and a response time is long.

| | |
|---|---|
| 3-BB(F,F)CF2OBB-3 | 5.0% |
| 2-HBB(F)-F | 7.5% |
| 3-HBB(F)-F | 7.5% |
| 5-HBB(F)-F | 15.0% |
| 3-HBB(F,F)-F | 13.0% |
| 5-HBB(F,F)-F | 13.0% |
| 3-HBB(F,F)CF2OB(F,F)-F | 11.0% |
| 5-HBB(F,F)CF2OB(F,F)-F | 11.0% |
| 5-HBB(F)B-2 | 9.0% |
| 5-HBB(F)B-3 | 8.0% |

$T_{NI}$ = 133.4° C.; $T_C$ < -20° C.; η = 43.9 mPa · s; Δn = 0.170; Vth = 1.59 V; VHR (25° C.) = 99.1%; VHR (100° C.) = 96.3%; VHR (UV) = 97.4%; $T_{NI}$ (UV) = 133.0° C.; τ = 38.4 ms.

Comparative Example 4

Prepared was a composition (Example 2) disclosed in Japanese Patent Application Laid-Open No. 257535/1992. The components and the characteristics of this composition are described below. In this composition, an optical anisotropy is small, and VHR (100 degrees C.) and VHR (UV) are low.

| | |
|---|---|
| ZLI-1565 | 90% |
| 5-BB(2F,5F)B-5 | 10% |

$T_{NI}$ = 85.3° C.; $T_C$ < -30° C.; Δn = 0.135; η = 20.5 mPa · s; Vth = 2.34 V; VHR (25° C.) = 88.5%; VHR (100° C.) = 62.3%; VHR (UV) = 83.3%; $T_{NI}$ (UV) = 85.0° C.; τ = 33.2 ms.

Example 1

| | | |
|---|---|---|
| 2-BB(2F,5F)B-2 | (1) | 7% |
| 3-BB(2F,5F)B-3 | (1) | 10% |
| 2-BBB(2F,5F)B(2F)-5 | (1) | 2% |
| 3-BBB(2F,5F)B(2F)-5 | (1) | 3% |
| 2-BBB(2F,5F)B(F)-5 | (1) | 2% |
| 3-BBB(2F,5F)B(F)-5 | (1) | 3% |
| 2-BB(F)B(2F,5F)B-5 | (1) | 2% |
| 3-BB(F)B(2F,5F)B-5 | (1) | 3% |
| 2-BB(2F)B(2F,5F)B-5 | (1) | 2% |
| 3-BB(2F)B(2F,5F)B-5 | (1) | 3% |
| 3-BB(F,F)CF2OB(F)-F | (2) | 13% |
| 3-BB(F,F)CF2OB(F)-OCF3 | (2) | 2% |
| 3-BB(F,F)CF2OB-OCF3 | (2) | 3% |
| 3-HB(F,F)CF2OB(F,F)-F | (2) | 2% |
| 2-HBB(F)-F | (2) | 7.5% |
| 3-HBB(F)-F | (2) | 7.5% |

-continued

| | | |
|---|---|---|
| 5-HBB(F)-F | (2) | 15% |
| 3-HBB(F,F)-F | (2) | 13% |

$T_{NI}$ = 92.9° C.; $T_C$ < −30° C.; $\Delta n$ = 0.194; $\eta$ = 77.8 mPa·s; Vth = 1.36 V; VHR (25° C.) = 99.2%; VHR (100° C.) = 96.1%; VHR (UV) = 98.7%; $T_{NI}$ (UV) = 92.2° C.; $\tau$ = 26.5 ms.

Example 2

| | | |
|---|---|---|
| 2-BB(2F,5F)B-2 | (1) | 7% |
| 3-BB(2F,5F)B-3 | (1) | 10% |
| 3-BB(F,F)CF2OB(F,F)-F | (2) | 13% |
| 3-HB(F,F)CF2OB(F)-F | (2) | 2% |
| 2-HBB(F)-F | (2) | 7.5% |
| 3-HBB(F)-F | (2) | 7.5% |
| 5-HBB(F)-F | (2) | 15% |
| 3-BBB(F,F)-CL | (2) | 2% |
| 3-BB(F,F)CF2OBB(F)-F | (2) | 5% |
| 5-BB(F,F)CF2OBB(F)-F | (2) | 5% |
| 3-BB(F,F)CF2OBB-F | (2) | 5% |
| 5-BB(F,F)CF2OBB-F | (2) | 5% |
| 2-HHBB(F,F)-F | (2) | 3% |
| 3-HHBB(F,F)-F | (2) | 4% |
| 5-HHBB(F,F)-F | (2) | 5% |
| 3-HH2BB(F,F)-F | (2) | 4% |

$T_{NI}$ = 103.9° C.; $T_C$ < −30° C.; $\Delta n$ = 0.177; $\eta$ = 51.0 mPa·s; Vth = 1.47 V; VHR (25° C.) = 99.0%; VHR (100° C.) = 95.8%; VHR (UV) = 98.5%; $T_{NI}$ (UV) = 103.1° C.; $\tau$ = 21.8 ms.

Example 3

| | | |
|---|---|---|
| 3-BB(2F,5F)B-3 | (1) | 6% |
| 3-BB(2F,5F)B(2F)-3 | (1) | 2% |
| 3-BB(2F,5F)B(F)-3 | (1) | 2% |
| 3-BB(F,F)CF2OB(F,F)-F | (2) | 4% |
| 3-HB(F,F)CF2OB-F | (2) | 2% |
| 2-HBEB(F,F)-F | (2) | 3% |
| 3-HBEB(F,F)-F | (2) | 3% |
| 5-HBEB(F,F)-F | (2) | 3% |
| 3-HB(F)EB-OCF3 | (2) | 3% |
| 2-HBB(F)-F | (2) | 7.5% |
| 3-HBB(F)-F | (2) | 7.5% |
| 5-HBB(F)-F | (2) | 15% |
| 3-BB(F)B(F,F)-F | (2) | 5% |
| 3-BB(F,F)CF2OBB(F)-F | (2) | 5% |
| 5-BB(F,F)CF2OBB(F)-F | (2) | 5% |
| 3-BB(F,F)CF2OBB-F | (2) | 5% |
| 5-BB(F,F)CF2OBB-F | (2) | 5% |
| 3-BB(F,F)CF2OBB(F)-OCF3 | (2) | 3% |
| 3-BB(F,F)CF2OBB-F | (2) | 5% |
| 3-HHBB(F,F)-F | (2) | 3% |
| 5-HHBB(F,F)-F | (2) | 3% |
| 3-HHB(F)B(F,F)-F | (2) | 3% |

$T_{NI}$ = 105.6° C.; $T_C$ < −30° C.; $\Delta n$ = 0.175; $\eta$ = 52.7 mPa·s; Vth = 1.39 V; VHR (25° C.) = 98.9%; VHR (100° C.) = 95.3%; VHR (UV) = 96.3%; $T_{NI}$ (UV) = 104.9° C.; $\tau$ = 24.3 ms.

Example 4

| | | |
|---|---|---|
| 2-BB(2F,5F)B-2 | (1) | 2% |
| 3-BB(2F,5F)B-3 | (1) | 7% |
| 2-BBB(2F,5F)B(2F)-5 | (1) | 2% |
| 3-BB(F,F)CF2OB(F,F)-F | (2) | 13% |
| 3-HB(F,F)CF2OB(F,F)-F | (2) | 2% |
| 2-HBB(F)-F | (2) | 7.5% |
| 3-HBB(F)-F | (2) | 7.5% |
| 5-HBB(F)-F | (2) | 15% |
| 3-HB(F,F)B(F)-F | (2) | 4% |
| 3-HB(F)B(F,F)-F | (2) | 4% |
| 3-BB(F,F)CF2OBB(F)-F | (2) | 7% |
| 5-BB(F,F)CF2OBB(F)-F | (2) | 8% |
| 3-BB(F,F)CF2OBB-F | (2) | 6% |
| 5-BB(F,F)CF2OBB-F | (2) | 7% |
| 2-HHBB(F,F)-F | (2) | 2% |
| 3-HHBB(F,F)-F | (2) | 2% |
| 5-HHBB(F,F)-F | (2) | 2% |
| 3-HHB(F)B(F,F)-F | (2) | 2% |

$T_{NI}$ = 96.4° C.; $T_C$ < −30° C.; $\Delta n$ = 0.175; $\eta$ = 53.8 mPa·s; Vth = 1.33 V; VHR (25° C.) = 99.2%; VHR (100° C.) = 96.1%; VHR (UV) = 97.2%; $T_{NI}$ (UV) = 96.0° C.; $\tau$ = 23.8 ms.

Example 5

| | | |
|---|---|---|
| 3-BB(2F,5F)B-3 | (1) | 10% |
| 3-BB(F,F)B-3 | (1) | 2% |
| 3-BB(F)B(2F)-3 | (1) | 2% |
| 2-B(F)B(2F)-4 | (1) | 2% |
| 2-BBB(F,F)B-5 | (1) | 1.5% |
| 3-BBB(F,F)B-5 | (1) | 1.5% |
| 2-BBB(F,F)B(2F)-5 | (1) | 2% |
| 3-BBB(F,F)B(2F)-5 | (1) | 2% |
| 2-BBB(F,F)B(F)-5 | (1) | 1.5% |
| 3-BBB(F,F)B(F)-5 | (1) | 1.5% |
| 3-BB(F,F)CF2OB(F,F)-F | (2) | 15% |
| 2-HBB(F)-F | (2) | 7.5% |
| 3-HBB(F)-F | (2) | 7.5% |
| 5-HBB(F)-F | (2) | 15% |
| 3-H2BB(F)-F | (2) | 4% |
| 3-BB(F,F)CF2OBB(F)-F | (2) | 4% |
| 5-BB(F,F)CF2OBB(F)-F | (2) | 5% |
| 3-BB(F,F)CF2OBB-F | (2) | 3% |
| 2-HHBB(F,F)-F | (2) | 2% |
| 3-HHBB(F,F)-F | (2) | 3% |
| 3-HNpr(F)B(F,F)-F | (2) | 2% |
| 3-HNp(F)-F | (2) | 2% |
| 3-HNpB(F,F)-F | (2) | 2% |
| 3-HNp(F)B(F,F)-F | (2) | 2% |

$T_{NI}$ = 97.0° C.; $T_C$ < −20° C.; $\Delta n$ = 0.178; $\eta$ = 72.2 mPa·s; Vth = 1.41 V; VHR (25° C.) = 99.2%; VHR (100° C.) = 96.1%; VHR (UV) = 97.1%; $T_{NI}$ (UV) = 96.5° C.; $\tau$ = 25.5 ms.

Example 6

| | | |
|---|---|---|
| 2-BB(2F,5F)B-2 | (1) | 7% |
| 3-BB(2F,5F)B-3 | (1) | 8% |
| 3-BB(F,F)CF2OB(F,F)-F | (2) | 20% |
| 2-HBB(F)-F | (2) | 5% |
| 3-HBB(F)-F | (2) | 5% |
| 5-HBB(F)-F | (2) | 10% |
| 3-HBB(F)-F | (2) | 25% |
| 5-HBB(F)B-2 | (3) | 10% |
| 5-HBB(F)B-3 | (3) | 10% |

$T_{NI}$ = 107.5° C.; $T_C$ < −20° C.; $\Delta n$ = 0.179; $\eta$ = 54.0 mPa·s; Vth = 1.59 V; VHR (25° C.) = 99.2%; VHR (100° C.) = 96.1%; VHR (UV) = 97.1%; $T_{NI}$ (UV) = 107.0° C.; $\tau$ = 20.4 ms.

Example 7

| | | |
|---|---|---|
| 3-BB(2F,5F)B-3 | (1) | 10% |
| 3-BB(F,F)CF2OB(F,F)-F | (2) | 20% |
| 3-HBB(F,F)-F | (2) | 20% |

-continued

| | | |
|---|---|---|
| 5-HBB(F,F)-F | (2) | 10% |
| 3-H2BB(F,F)-F | (2) | 5% |
| 3-BB(F,F)CF2OBB(F)-F | (2) | 5% |
| 3-BB(F,F)CF2OBB-F | (2) | 10% |
| 3-HNprB(F,F)-F | (2) | 2% |
| 5-HBB(F)B-2 | (3) | 10% |
| 7-BB(2F,5F) | (3) | 2% |
| 5-BBB(2F,5F)B | (3) | 2% |
| 5-BBB(2F,5F)B(2F) | (3) | 2% |
| 5-BBB(2F,5F)B(F) | (3) | 2% |

$T_{NI}$ = 95.8° C.; $T_C$ < −30° C.; $\Delta n$ = 0.176; $\eta$ = 65.8 mPa · s; Vth = 1.15 V; VHR (25° C.) = 98.6%; VHR (100° C.) = 95.8%; VHR (UV) = 96.7%; $T_{NI}$ (UV) = 95.3° C.; $\tau$ = 25.7 ms.

Example 8

| | | |
|---|---|---|
| 3-BB(2F,5F)B-3 | (1) | 10% |
| 3-BB(F,F)CF2OB(F,F)-F | (2) | 20% |
| 2-HBB(F)-F | (2) | 5% |
| 3-HBB(F)-F | (2) | 5% |
| 5-HBB(F)-F | (2) | 10% |
| 3-H2BB(F)-F | (2) | 4% |
| 3-HBB(F,F)-F | (2) | 21% |
| 5-HBB(F)B-2 | (3) | 10% |
| 5-HBB(F)B-3 | (3) | 10% |
| 5-BB(2F,5F)B | (3) | 5% |

$T_{NI}$ = 107.1° C.; $T_C$ < −30° C.; $\Delta n$ = 0.178; $\eta$ = 54.3 mPa · s; Vth = 1.60 V; VHR (25° C.) = 99.2%; VHR (100° C.) = 96.1%; VHR (UV) = 97.1%; $T_{NI}$ (UV) = 106.6° C.; $\tau$ = 20.5 ms.

Example 9

| | | |
|---|---|---|
| 3-BB(2F,5F)B-3 | (1) | 10% |
| 2-BBB(2F,5F)B(2F)-5 | (1) | 2% |
| 2-BBB(2F,5F)B(F)-5 | (1) | 2% |
| 2-BB(F)B(2F,5F)B-5 | (1) | 2% |
| 2-BB(2F)B(2F,5F)B-5 | (1) | 2% |
| 3-BB(F,F)CF2OB(F,F)-F | (2) | 13% |
| 3-BB(F,F)CF2OB(F)-OCF3 | (2) | 2% |
| 3-BB(F,F)CF2OB-OCF3 | (2) | 3% |
| 3-HB(F,F)CF2OB(F,F)-F | (2) | 2% |
| 2-HBB(F)-F | (2) | 7.5% |
| 3-HBB(F)-F | (2) | 7.5% |
| 5-HBB(F)-F | (2) | 15% |
| 3-HBB(F,F)-F | (2) | 13% |
| 5-HBB(F)B-2 | (3) | 6% |
| 5-BB(2F,5F)B(2F) | (3) | 2% |
| 5-BB(2F,5F)B(F) | (3) | 2% |
| 5-BB(2F)B(2F,5F)B | (3) | 2% |
| 5-BBB(F,F)B | (3) | 2% |
| 5-BBB(F,F)B(2F) | (3) | 2% |
| 5-BBB(F)B(2F) | (3) | 3% |

$T_{NI}$ = 101.9° C.; $T_C$ < −20° C.; $\Delta n$ = 0.191; $\eta$ = 82.7 mPa · s; Vth = 1.39 V; VHR (25° C.) = 99.2%; VHR (100° C.) = 96.1%; VHR (UV) = 97.1%; $T_{NI}$ (UV) = 101.4° C.; $\tau$ = 25.8 ms.

Example 10

| | | |
|---|---|---|
| 3-BB(2F, 5F)B-3 | (1) | 10% |
| 3-BB(F, F)CF2OB(F, F)-F | (2) | 13% |
| 3-HB(F, F)CF2OB(F)-F | (2) | 2% |
| 2-HBB(F)-F | (2) | 6% |
| 3-HBB(F)-F | (2) | 6% |
| 5-HBB(F)-F | (2) | 12% |
| 3-HBB(F, F)-F | (2) | 5% |

-continued

| | | |
|---|---|---|
| 3-BBB(F, F)-CL | (2) | 2% |
| 3-BB(F, F)CF2OBB(F)-F | (2) | 5% |
| 5-BB(F, F)CF2OBB(F)-F | (2) | 5% |
| 3-BB(F, F)CF2OBB-F | (2) | 5% |
| 5-BB(F, F)CF2OBB-F | (2) | 5% |
| 2-HHBB(F, F)-F | (2) | 3% |
| 3-HHBB(F, F)-F | (2) | 4% |
| 3-HH2BB(F, F)-F | (2) | 4% |
| 5-HBB(F)B-2 | (3) | 5% |
| 5-BB(F,F)B(F) | (3) | 2% |
| 5-BB(F)B(2 F) | (3) | 2% |
| 7-B(F, F)B(F) | (3) | 2% |
| 7-B(F)B(2F) | (3) | 2% |

$T_{NI}$ = 101.9° C.; $T_C$ < −20° C.; $\Delta n$ = 0.175; $\eta$ = 58.8 mPa · s; Vth = 1.37 V; VHR (25° C.) = 99.0%; VHR (100° C.) = 95.8%; VHR (UV) = 98.5%; $T_{NI}$ (UV) = 101.5° C.; $\tau$ = 24.6 ms.

Example 11

| | | |
|---|---|---|
| 3-BB (2F, 5F) B-3 | (1) | 6% |
| 3-BB (2F, 5F) B (2F) -3 | (1) | 2% |
| 3-BB (2F, 5F) B (F) -3 | (1) | 2% |
| 3-BB (F, F) CF2OB (F, F) -F | (2) | 4% |
| 3-HB (F, F) CF2OB-F | (2) | 2% |
| 2-HBEB (F, F) -F | (2) | 3% |
| 3-HBEB (F, F) -F | (2) | 3% |
| 5-HBEB (F, F) -F | (2) | 3% |
| 3-HB (F) EB-OCF3 | (2) | 3% |
| 2-HBB (F) -F | (2) | 6% |
| 3-HBB (F) -F | (2) | 6% |
| 5-HBB (F) -F | (2) | 12% |
| 3-BB (F) B (F, F) -F | (2) | 4% |
| 3-BB (F, F) CF2OBB (F) -F | (2) | 3% |
| 5-BB (F, F) CF2OBB (F) -F | (2) | 2% |
| 3-BB (F, F) CF2OBB-F | (2) | 3% |
| 5-BB (F, F) CF2OBB-F | (2) | 2% |
| 3-BB (F, F) CF2OBB (F) -OCF3 | (2) | 3% |
| 3-HB (F, F) CF2OBB-F | (2) | 5% |
| 3-HHBB (F, F) -F | (2) | 3% |
| 3-HHB (F) B (F, F) -F | (2) | 3% |
| 5-HBB (F) B-2 | (3) | 6% |
| 5-BB (2F, 5F) B | (3) | 6% |
| 7-B (F) B (2F, 5F) | (3) | 2% |
| 7-B (F, F) B | (3) | 2% |
| 5-BBB (F, F) B (2F) | (3) | 2% |
| 5-BBB (F, F) B (F) | (3) | 2% |

$T_{NI}$ = 107.4° C.; $T_C$ < −20° C.; $\Delta n$ = 0.184; $\eta$ = 69.9 mPa · s; Vth = 1.45 V; VHR (25° C.) = 98.9%; VHR (100° C.) = 95.3%; VHR (UV) = 96.3%; $T_{NI}$ (UV) = 106.9° C.; $\tau$ = 25.8 ms.

Example 12

| | | |
|---|---|---|
| 3-BB(2F,5F)B-3 | (1) | 8% |
| 3-BB(F,F)B(2F)-3 | (1) | 2% |
| 3-BB(F,F)B(F)-3 | (1) | 2% |
| 2-BB(2F,5F)-4 | (1) | 2% |
| 2-B(F)B(2F,5F)-4 | (1) | 2% |
| 2-B(2F)B(2F,5F)-4 | (1) | 2% |
| 2-BB(F,F)BB-5 | (1) | 2% |
| 2-BB(F,F)B(2F)B-5 | (1) | 2% |
| 2-BB(F,F)B(F)B-5 | (1) | 2% |
| 2-BB(F)B(2F)B-5 | (1) | 2% |
| 2-BBB(F)B(2F)-5 | (1) | 2% |
| 3-BB(F,F)CF2OB(F,F)-F | (2) | 20% |
| 3-BB(F,F)CF2OB-F | (2) | 5% |
| 3-HB(F,F)CF2OB(F)-OCF3 | (2) | 5% |
| 3-H2BB(F)-F | (2) | 3% |

-continued

| | | |
|---|---|---|
| 3-HBB(F,F)-F | (2) | 5% |
| 3-H2BB(F,F)-F | (2) | 8% |
| 3-HNpr(F)B(F,F)-F | (2) | 2% |
| 5-HBBH-3 | (3) | 3% |
| 5-HBB(F)B-2 | (3) | 8% |
| 5-HBB(F)B-3 | (3) | 4% |
| 5-HB(F)BH-2 | (3) | 3% |
| 5-BB(F,F)BB | (3) | 2% |
| 5-BB(F,F)B(2F)B | (3) | 2% |
| 5-BB(F,F)B(F)B | (3) | 2% |

$T_{NI}$ = 104.8° C.; $T_C$ < −20° C.; Δn = 0.190; η = 78.6 mPa · s; Vth = 1.43 V; VHR (25° C.) = 98.6%; VHR (100° C.) = 95.1%; VHR (UV) = 97.3%; $T_{NI}$ (UV) = 104.4° C.; τ = 25.7 ms.

Example 13

| | | |
|---|---|---|
| 2-BB(2F,5F)B-2 | (1) | 2% |
| 3-BB(2F,5F)B-3 | (1) | 7% |
| 2-BBB(F)B(2F)-5 | (1) | 2% |
| 3-BB(F,F)CF2OB(F,F)-F | (2) | 13% |
| 3-HB(F,F)CF2OB-F | (2) | 2% |
| 2-HBB(F)-F | (2) | 7.5% |
| 3-HBB(F)-F | (2) | 7.5% |
| 5-HBB(F)-F | (2) | 15% |
| 3-HB(F,F)B(F)-F | (2) | 4% |
| 3-HB(F)B(F,F)-F | (2) | 4% |
| 3-BB(F,F)CF2OBB(F)-F | (2) | 7% |
| 5-BB(F,F)CF2OBB(F)-F | (2) | 7% |
| 3-BB(F,F)CF2OBB-F | (2) | 5% |
| 5-BB(F,F)CF2OBB-F | (2) | 6% |
| 3-HHB(F)B(F,F)-F | (2) | 2% |
| 3-HNpB(F,F)-F | (2) | 2% |
| 1O1-HBBH-5 | (3) | 5% |
| 5-BB(F)B(2F,5F)B | (3) | 2% |

$T_{NI}$ = 107.9° C.; $T_C$ < −20° C.; Δn = 0.184; η = 67.5 mPa · s; Vth = 1.38 V; VHR (25° C.) = 99.2%; VHR (100° C.) = 96.1%; VHR (UV) = 97.2%; $T_{NI}$ (UV) = 107.5° C.; τ = 25.2 ms.

Example 14

| | | |
|---|---|---|
| 3-BB(2F,5F)B-3 | (1) | 10% |
| 3-BB(F,F)B-3 | (1) | 2% |
| 3-BB(F)B(2F)-3 | (1) | 2% |
| 2-B(F)B(2F)-4 | (1) | 2% |
| 2-BBB(F,F)B-5 | (1) | 2% |
| 2-BBB(F,F)B(2F)-5 | (1) | 2% |
| 2-BBB(F,F)B(F)-5 | (1) | 2% |
| 3-BB(F,F)CF2OB(F,F)-F | (2) | 15% |
| 2-HBB(F)-F | (2) | 7.5% |
| 3-HBB(F)-F | (2) | 7.5% |
| 5-HBB(F)-F | (2) | 15% |
| 3-H2BB(F)-F | (2) | 4% |
| 3-HHBB(F,F)-F | (2) | 6% |
| 3-BB(F,F)CF2OBB(F)-F | (2) | 4% |
| 5-BB(F,F)CF2OBB(F)-F | (2) | 5% |
| 3-BB(F,F)CF2OBB-F | (2) | 3% |
| 2-HBB(F,F)-F | (2) | 2% |
| 3-HHBB(F,F)-F | (2) | 3% |
| 3-NpB(F,F)-F | (2) | 2% |
| 5-BB(F)B(2F)B | (3) | 2% |
| 5-BBB(F)B(2F) | (3) | 2% |

$T_{NI}$ = 98.9° C.; $T_C$ < −30° C.; Δn = 0.181; η = 66.2 mPa · s; Vth = 1.37 V; VHR (25° C.) = 99.2%; VHR (100° C.) = 96.1%; VHR (UV) = 97.1%; $T_{NI}$ (UV) = 98.3° C.; τ = 24.5 ms.

Example 15

| | | |
|---|---|---|
| 2-BB(2F,5F)B-2 | (1) | 5% |
| 3-BB(2F,5F)B-3 | (1) | 8% |
| 3-BB(F,F)CF2OB(F,F)-F | (2) | 15% |
| 2-HBB(F)-F | (2) | 5% |
| 3-HBB(F)-F | (2) | 5% |
| 5-HBB(F)-F | (2) | 10% |
| 3-HBB(F,F)-F | (2) | 11% |
| 3-H2BB(F)-F | (2) | 5% |
| 3-BB(F,F)CF2OBB(F)-F | (2) | 5% |
| 3-BB(F,F)CF2OBB-F | (2) | 5% |
| 3-Npr(F)B(F,F)-F | (2) | 2% |
| 3-NprB(F,F)-F | (2) | 2% |
| 5-HBB(F)B-2 | (3) | 10% |
| 5-HBB(F)B-3 | (3) | 10% |
| 7-B(F,F)B(2F) | (3) | 2% |

$T_{NI}$ = 107.7° C.; $T_C$ < −20° C.; Δn = 0.185; η = 56.2 mPa · s; Vth = 1.57 V; VHR (25° C.) = 99.2%; VHR (100° C.) = 96.1%; VHR (UV) = 97.1%; $T_{NI}$ (UV) = 107.3° C.; τ = 20.5 ms.

Example 16

| | | |
|---|---|---|
| 2-BB(2F,5F)B-2 | (1) | 7% |
| 3-BB(2F,5F)B-3 | (1) | 8% |
| 3-BB(F,F)CF2OB(F,F)-F | (2) | 20% |
| 2-HBB(F)-F | (2) | 5% |
| 3-HBB(F)-F | (2) | 5% |
| 5-HBB(F)-F | (2) | 10% |
| 3-BB(F,F)CF2OBB(F)-F | (2) | 4% |
| 3-HHBB(F,F)-F | (2) | 3% |
| 5-HHBB(F,F)-F | (2) | 3% |
| 3-Npr(F)B(F,F)-F | (2) | 2% |
| 3-HNpr(F)B(F,F)-F | (2) | 2% |
| 3-Np(F)B(F,F)-F | (2) | 2% |
| 5-HBB(F)B-2 | (3) | 10% |
| 5-HBB(F)B-3 | (3) | 4% |
| 5-BB(F)B | (3) | 3% |
| 5-BB(F)B(2F) | (3) | 4% |
| 7-B(2F)B(2F,5F) | (3) | 3% |
| 5-BB(F,F)BB | (3) | 2% |
| 5-BB(F)B(2F)B | (3) | 3% |

$T_{NI}$ = 101.7° C.; $T_C$ < −20° C.; Δn = 0.186; η = 70.6 mPa · s; Vth = 1.66 V; VHR (25° C.) = 99.2%; VHR (100° C.) = 96.1%; VHR (UV) = 97.1%; $T_{NI}$ (UV) = 101.3° C.; τ = 25.3 ms.

Example 17

| | | |
|---|---|---|
| 3-BB(2F,5F)B-3 | (1) | 10% |
| 3-BB(F,F)CF2OB(F,F)-F | (2) | 20% |
| 2-HBB(F)-F | (2) | 5% |
| 3-HBB(F)-F | (2) | 5% |
| 5-HBB(F)-F | (2) | 10% |
| 3-H2BB(F)-F | (2) | 2% |
| 3-HBB(F,F)-F | (2) | 21% |
| 5-HBB(F)B-2 | (3) | 10% |
| 5-HBB(F)B-3 | (3) | 10% |
| 5-BB(2F,5F)B | (3) | 5% |
| 3-HBB-F | (−) | 2% |

$T_{NI}$ = 107.9° C.; $T_C$ < −30° C.; Δn = 0.179; η = 53.8 mPa · s; Vth = 1.62 V; VHR (25° C.) = 99.3%; VHR (100° C.) = 96.2%; VHR (UV) = 97.2%; $T_{NI}$ (UV) = 107.5° C.; τ = 20.3 ms.

Effects of the Invention

The compositions of the present invention had the general characteristics required for the composition, a nematic phase, a particularly large optical anisotropy and a positive dielectric anisotropy. The liquid crystal display elements of the present invention comprising this composition had the general characteristics required for the element and a short response time. This composition was suited to an element having a small cell gap and suited particularly to an AM element having a small cell gap.

What is claimed is:

1. A liquid crystal composition comprising a first component consisting of at least one compound selected from a group of compounds represented by Formula (I) and a second component consisting of at least one compound selected from a group of compounds represented by Formulas (II-1) to (II-8):

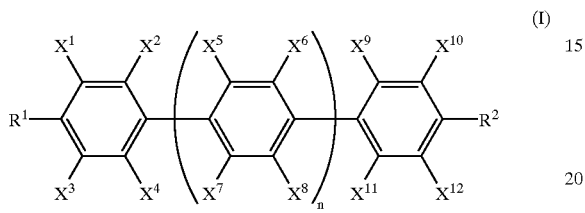
(I)

wherein $R^1$ and $R^2$ are independently alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 0, or 1, and

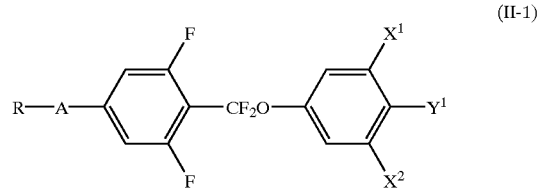
(II-1)

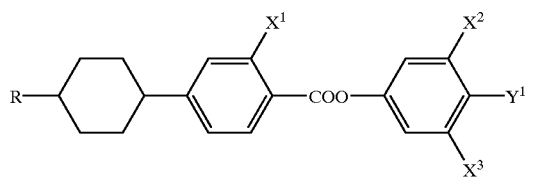
(II-2)

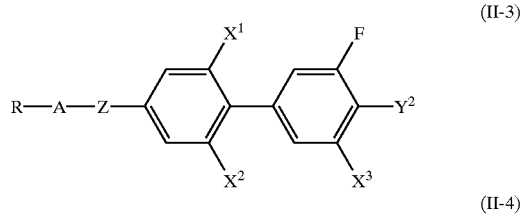
(II-3)

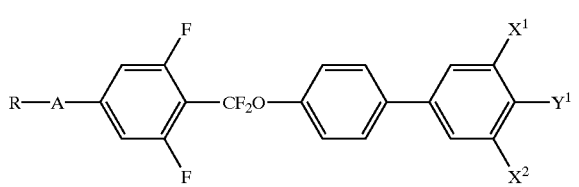
(II-4)

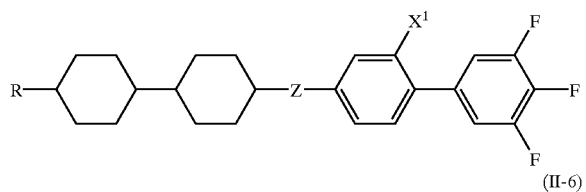
(II-5)

(II-6)

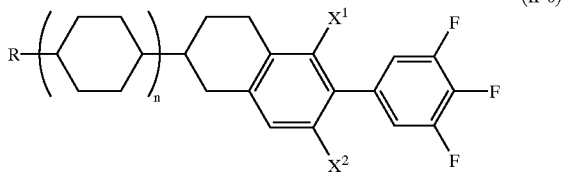
(II-7)

(II-8)

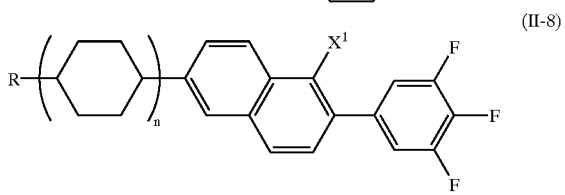

wherein R is alkyl having 1 to 10 carbons; A is 1,4-phenylene or 1,4-cyclohexylene; $X^1$, $X^2$ and $X^3$ are independently hydrogen or fluorine; $Y^1$ is fluorine or —$OCF_3$, and $Y^2$ is fluorine or chlorine; Z is a single bond or —$C_2H_4$—; and n is 0 or 1.

2. The liquid crystal composition as described in claim 1, wherein the first component accounts for 5% to 50% by weight, and the second component accounts for 30% to 95% by weight each based on the whole weight of the liquid crystal composition.

3. The liquid crystal composition as described in claim 1, further comprising a third component consisting of at least one compound selected from a group of compounds represented by Formulas (III-1) and (III-2):

(III-1)

wherein R' is alkyl having 1 to 10 carbons or alkoxymethyl having 2 to 10 carbons; R is alkyl having 1 to 10 carbons; A is 1,4-phenylene or 1,4-cyclohexylene; and $X^1$ and $X^2$ are independently hydrogen or fluorine;

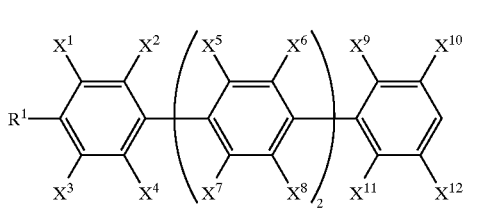

(III-2)

wherein $R^1$ is alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 0, 1 or 2.

4. The liquid crystal composition as described in claim 2, further comprising a third component consisting of at least one compound selected from a group of compounds represented by Formulas (III-1) and (III-2):

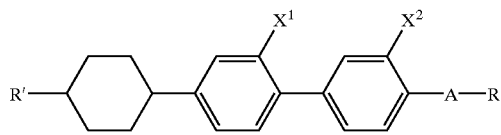

(III-1)

wherein R' is alkyl having 1 to 10 carbons or alkoxymethyl having 2 to 10 carbons; R is alkyl having 1 to 10 carbons; A is 1,4-phenylene or 1,4-cyclohexylene; and $X^1$ and $X^2$ are independently hydrogen or fluorine;

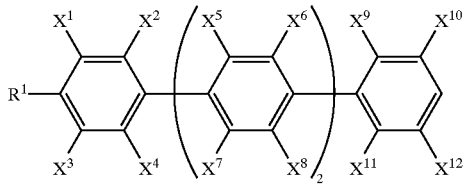

(III-2)

wherein $R^1$ is alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 0,1 or 2.

5. The liquid crystal composition as described in claim 3, wherein the third component accounts for 1% to 40% by weight based on the whole weight of the liquid crystal composition.

6. The liquid crystal composition as described in claim 4, wherein the third component accounts for 1% to 40% by weight based on the whole weight of the liquid crystal composition.

7. A liquid crystal composition comprising a first component consisting of at least one compound selected from a group of compounds represented by Formula (I-1-1) and a second component consisting of at least one compound selected from a group of compounds represented by Formulas (II-1-1), (II-1-3), (II-1-6), (II-3-1), (II-3-2), (II-3-3), (II-3-4), (II-5-1), and (II-5-2):

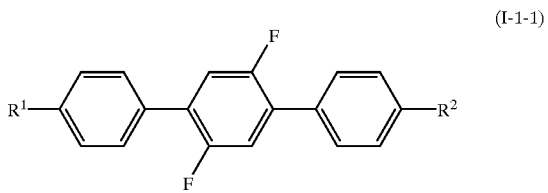

(I-1-1)

wherein R' and $R^2$ are independently alkyl having 1 to 10 carbons, alkoxy having 1 to 10 carbons or alkenyl having 2 to 10 carbons;

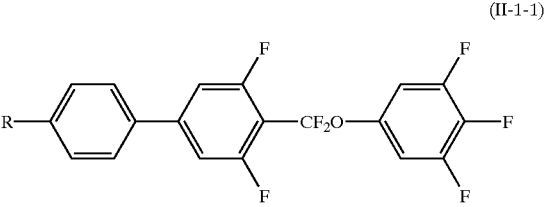

(II-1-1)

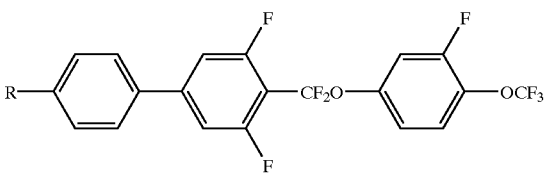

(II-1-3)

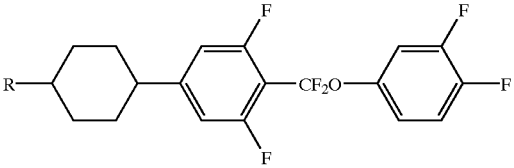

(II-1-6)

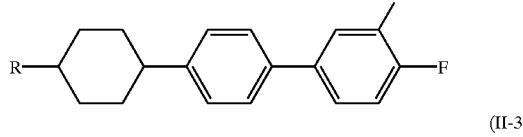

(II-3-1)

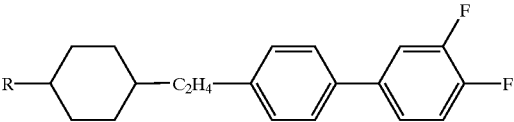

(II-3-2)

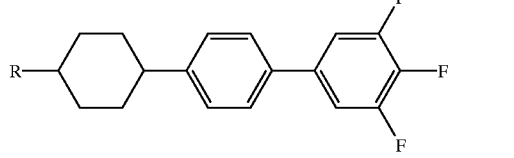

(II-3-3)

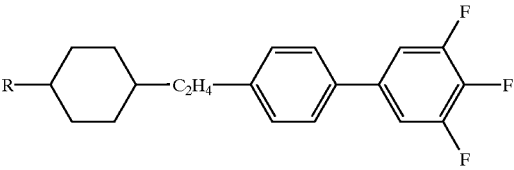

(II-3-4)

-continued (II-5-1)

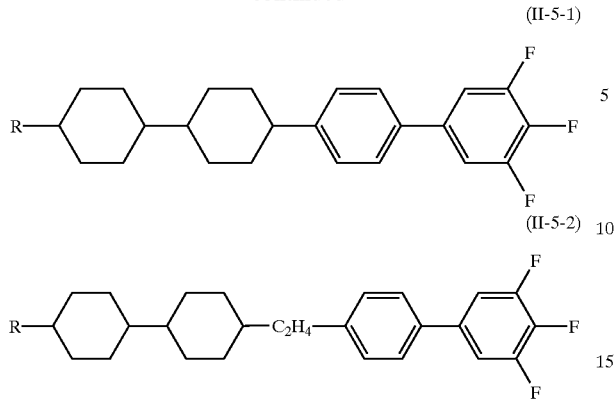

(II-5-2)

wherein R is alkyl having 1 to 10 carbons.

8. The liquid crystal composition as described in claim 7, wherein the first component accounts for 5% to 50% by weight, and the second component accounts for 30% to 95% by weight each based on the whole weight of the liquid crystal composition.

9. The liquid crystal composition as described in claim 7, further comprising a third component consisting of at least one compound selected from a group of compounds represented by Formulas (III-1-1) and (III-2-1):

(III-1-1)

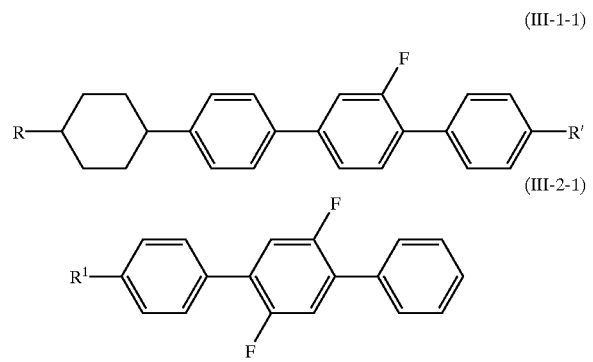

(III-2-1)

wherein R is alkyl having 1 to 10 carbons; $R^1$ is alkyl having 1 to 10 carbons, alkoxy having 1 to 10 carbons or alkenyl having 2 to 10 carbons; and R' is alkyl having 1 to 10 carbons or alkoxymethyl having 2 to 10 carbons.

10. The liquid crystal composition as described in claim 8, further comprising a third component consisting of at least one compound selected from a group of compounds represented by Formulas (III-1-1) and (III-2-1):

(III-1-1)

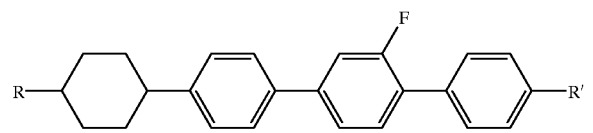

(III-2-1)

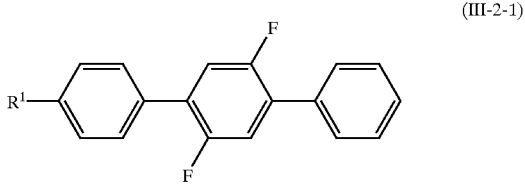

wherein R is alkyl having 1 to 10 carbons; $R^1$ is alkyl having 1 to 10 carbons, alkoxy having 1 to 10 carbons or alkenyl having 2 to 10 carbons; and R' is alkyl having 1 to 10 carbons or alkoxymethyl having 2 to 10 carbons.

11. The liquid crystal composition as described in claim 9, wherein the third component accounts for 1% to 30% by weight based on the whole weight of the liquid crystal composition.

12. The liquid crystal composition as described in claim 10, wherein the third component accounts for 1% to 30% by weight based on the whole weight of the liquid crystal composition.

13. A liquid crystal display element comprising the liquid crystal composition as described in claim 1.
14. A liquid crystal display element comprising the liquid crystal composition as described in claim 2.
15. A liquid crystal display element comprising the liquid crystal composition as described in claim 3.
16. A liquid crystal display element comprising the liquid crystal composition as described in claim 4.
17. A liquid crystal display element comprising the liquid crystal composition as described in claim 5.
18. A liquid crystal display element comprising the liquid crystal composition as described in claim 6.
19. A liquid crystal display element comprising the liquid crystal composition as described in claim 7.
20. A liquid crystal display element comprising the liquid crystal composition as described in claim 8.
21. A liquid crystal display element comprising the liquid crystal composition as described in claim 9.
22. A liquid crystal display element comprising the liquid crystal composition as described in claim 10.
23. A liquid crystal display element comprising the liquid crystal composition as described in claim 11.
24. A liquid crystal display element comprising the liquid crystal composition as described in claim 12.
25. A liquid crystal composition comprising a first component consisting of at least one compound selected from a group of compounds represented by Formula (I) and a second component consisting of at least one compound selected from a group of compounds represented by Formulas (II-6) to (II-8):

(I)

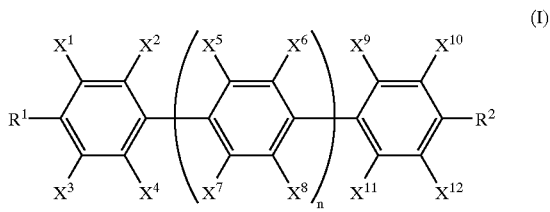

wherein $R^1$ and $R^2$ are independently alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 2, and

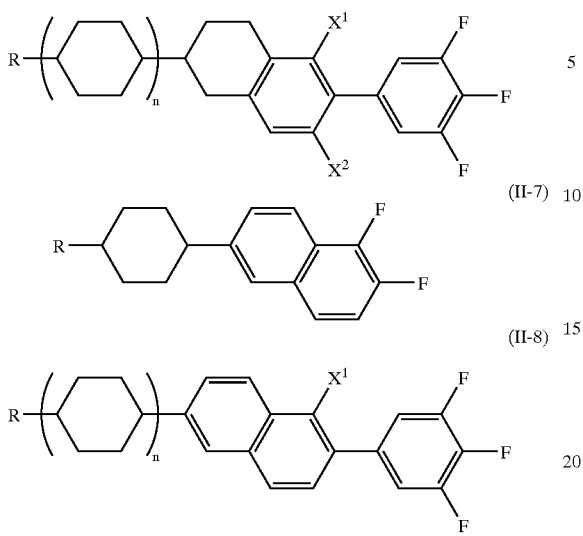

wherein R is alkyl having 1 to 10 carbons; $X^1$ and $X^2$ are independently hydrogen or fluorine; and n is 0 or 1.

26. A liquid crystal composition comprising a first component consisting of at least one compound selected from a group of compounds represented by Formula (I) and a second component consisting of at least one compound selected from a group of compounds represented by Formulas (II-1), (II-3) and (II-4):

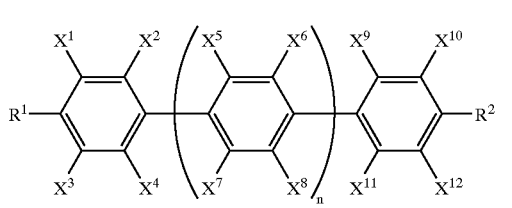

wherein $R^1$ and $R^2$ are independently alkyl having 1 to 10 carbons, alkoxy having 1 to 10 carbons or alkenyl having 2 to 10 carbons; $X^1$ to $X^{12}$ are independently hydrogen or fluorine, and at least two of $X^1$ to $X^{12}$ are fluorine; when one 1,4-phenylene has two fluorines, the positions of fluorines are 2- and 5-positions or 2- and 6-positions; and n is 2, and

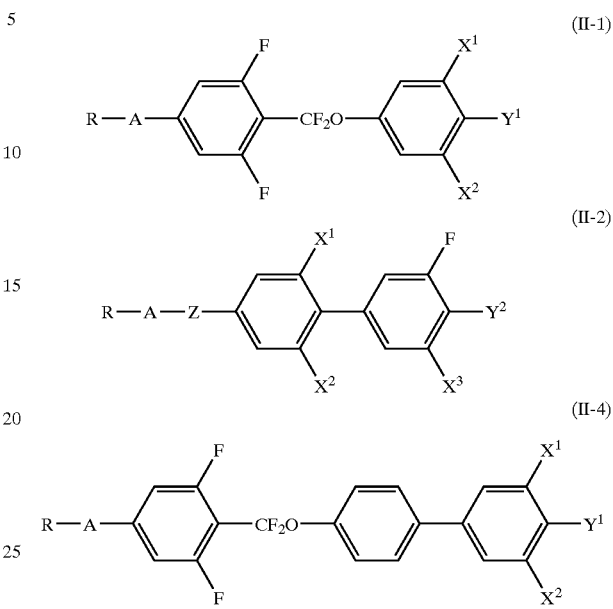

wherein R is alkyl having 1 to 10 carbons; A in Formula (II-4) is 1,4-phenylene or 1,4-cyclohexylene and A in Formula (II-1) and (II-3) is 1,4-phenylene; $X^1$, $X^2$ and $X^3$ are independently hydrogen or fluorine; $Y^1$ is fluorine or —$OCF_3$, and $Y^2$ is fluorine or chlorine; and Z is a single bond or —$C_2H_4$—.

27. A liquid crystal display element comprising the liquid crystal composition as described in claim 25.

28. A liquid crystal display element comprising the liquid crystal composition as described in claim 26.

* * * * *